United States Patent [19]

Sugihara et al.

[11] Patent Number: 5,025,561

[45] Date of Patent: Jun. 25, 1991

[54] GUIDE BAR FOR A CHAIN SAW

[75] Inventors: Hideo Sugihara, Takasu; Kazuhito Sugihara, Gifu, both of Japan

[73] Assignee: Sugihara Trading Co., Ltd., Gifu, Japan

[21] Appl. No.: 519,108

[22] Filed: May 4, 1990

[30] Foreign Application Priority Data

| | | | |
|---|---|---|---|
| May 8, 1989 | [JP] | Japan | 1-52768[U] |
| Nov. 1, 1989 | [JP] | Japan | 1-128711[U] |
| Nov. 27, 1989 | [JP] | Japan | 1-137819[U] |
| Jan. 18, 1990 | [JP] | Japan | 2-3595[U] |

[51] Int. Cl.[5] ........................ B23D 57/02; B23D 59/00

[52] U.S. Cl. .......................................... 30/387; 30/383

[58] Field of Search ................. 30/381, 383, 887, 381, 30/383, 387; 83/821; 264/46.5

[56] References Cited

U.S. PATENT DOCUMENTS

| | | | |
|---|---|---|---|
| 3,545,505 | 12/1970 | De Wesse et al. . | |
| 4,393,590 | 7/1983 | Pantzar | 30/387 |
| 4,473,581 | 10/1969 | Merz | 30/387 |
| 4,693,007 | 9/1987 | Apfel et al. | 30/387 |
| 4,794,696 | 1/1989 | Apfel et al. | 30/387 |
| 4,885,843 | 12/1989 | Kelsay, III et al. | 30/387 |
| 4,903,410 | 8/1990 | Wieninger et al. | 30/387 |

FOREIGN PATENT DOCUMENTS

| | | | |
|---|---|---|---|
| 657445 | 2/1963 | Canada | 30/387 |
| 1136812 | 9/1962 | Fed. Rep. of Germany | 30/387 |
| 1-101801 | 7/1989 | Japan . | |
| 1-122901 | 8/1989 | Japan . | |
| 2-31701 | 2/1990 | Japan . | |

*Primary Examiner*—Douglas D. Watts
*Assistant Examiner*—Paul M. Heyrana, Sr.
*Attorney, Agent, or Firm*—Oblon, Spivak, McClelland, Maier & Neustadt

[57] ABSTRACT

A guide bar for chain saw comprises a main body of a plate shape. The main body has first and second sides facing each other in the thickness direction of the main body. The main body includes at least a first recess provided on the first side, and a second recess provided on the second side of the main body. The first recess has a first portion communicated with the second recess so that the recesses define in combination a through hole at the communciating portion, and a second portion shielded by the second side of the main body. A filler is packed in said first and second recesses.

18 Claims, 17 Drawing Sheets

GUIDE BAR FOR A CHAIN SAW

BACKGROUND OF THE INVENTION

1. Field of the Invention

This invention generally relates to a guide bar for a chain saw, and more particular relates to a guide bar of which weight is lightened in order to promote the operation efficiency of a chain saw. The guide bar may be used for cutting wood, stone materials, concrete, etc.

2. Description of the Prior Art

Conventionally, this kind of a guide bar for a chain saw has been described in the Japanese Utility Model Laid-Open No. Sho-40-5277. The weight of this guide bar has been lightened by forming a number of through holes. Each of the through holes is filled up with such weight lightening members as synthetic resin, etc. so that it may not disturb the working operation due to that small twigs are inserted thereinto.

On the other hand, another guide bar has been also described in the Japanese Utility Model Laid-Open No. Sho-61-2901. This guide bar is lightened by forming shallow dents on the whole surface at both the sides thereof. Both the dents are also filled up with light materials as well as in the above guide bar.

But, if the diameter of the through holes is widened in order to sufficiently accomplish the lightening of the weight in the guide bar having through holes formed, of the above two types of guide bars, the strength and the rigidity of the guide bar may be lowered. As a result, the guide bar may be deflected in use and the working efficiency will be reduced. And the guide bar may vibrate in accompanying with the vibrations of the engine of a chain saw, thereby causing the cutting surface to be roughened. Furthermore, the weight lightening materials may come off due to vibrations in use and slight deflection of the guide bar. Therefore, the diameter of the through holes may be spontaneously restricted in order to prevent this kind of inconvenience, there may cause such a problem that the lightening of the weight of the guide bar can not be sufficiently accomplished.

On the other hand, as the thickness of the weight lightening material is very thin in a guide bar of which both the sides are provided with shallow dents, the weight lightening material may be warped in use. If the weight lightening material is warped, the edges of the weight lightening material come out from the side of the guide bar and may be caught at the cutting surface in use. Then, there may cause such a problem that the guide bar may not be used anymore.

In this kind of guide bar, the guide bar body 350 is provided with a dent 351 as shown in FIG. 66. By employing such a structure as have a filler material 353 like a shock-absorbing material, a weight-lightening material and an oil supplying material, etc., the weight of the whole chain saw can be accomplished together with achieving high performance of the whole chain saw. Thus, in order to secure the lightening of the weight and high performance of the whole chain saw as well as in the above, a guide bar shown in FIG. 69 is proposed. The guide bar body 350 is provided with through holes 352. A member in which two filler materials 353 are overlapped and fixed by a rivet 360 is inserted in every through hole 352.

In these conventional technologies, inversely tapered inserting portion 354*a* or protrusion 354*b*, etc. is provided on the inner circumferential portion of all the dents 351 or all the through holes 352. The outer circumferential portion of the filler material 353 is of such a shape that it can be fitted to the inserting portion 354 or the protrusion 354*b*, and a come-off preventing structure is employed therefor.

Hence, if the filler material 353 is increased in size, the filler material 353 may be floated or warped in the vicinity of the middle portion thereof as shown in FIG. 68 and FIG. 71 due to aging deformation or difference of thermal expansion between the filler material itself and the guide bar body. There may cause such a problem that the filler material may swell out from the side of the guide bar body 350. In this case, the contacting resistance with the cutting surface of wood may be produced, thereby causing the working efficiency to be remarkably spoiled. For this reason, only small filler materials may be used in the conventional guide bar and sufficient effects can not be expected in shock absorbing, lightening of the weight, oil supplying, etc.

This kind of inconvenience may occur when such a resin as have water sucking property is employed as filler material 353. Namely, the filler material 353 sucks in humidity or water from wood now under cutting or the ambient environments thereof and may swell out, and thereafter it may be dried and contracted. For this reason, in the case that there is no clearance between the guide bar body 350 and the filler material 353, such inconvenience as may be similar to the above may occur due to deformation of the filler material 353. To get rid of this kind of inconvenience, it may be considered that clearance between the guide bar body 350 and the filler material 353 may be secured in advance. However, in this case, as the outer edge portion of the filler material 353 can not be securely fixed to the guide bar body 350, the filler material 353 may be apt to come off from the guide bar body 350. And the aging deformation of the filler material 353 may occur very easily. As the aging deformation of the filler material 353 occurs, there may occur such a problem that the aging-deformed portion of the filler material 353 may be floated from the surface of the guide bar 350. In order to prevent this kind of inconvenience, it is necessary that such a filler material as have no water suction property or is not contracted when being solidified after filling is to be filled up so that any clearance between the filler material and the guide bar body may not be produced. However, such a filler material itself costs much and as the filling method thereof is difficult the cost therefor becomes high.

In the guide bar of the prior art shown in FIG. 67, the filler material 353 is cemented in the dent 351. However, even in this case, there may occur such a problem that the cementing portion of the filler material 353 may be easily peeled off due to vibrations produced by high speed travelling of the saw chain and oil and/or water which may enter the clearance between the dents 351 and the filler materials 353 in the working.

Furthermore, in the guide bar shown in FIG. 67, resin is filled up in the dents 351 by injection molding, thereby causing the filler material 353 to be formed. In this case, as resin may be slightly contracted in hardening, clearance may be produced between the dent 351 and the filler material 353 on completion, thereby causing the filler material 353 to be apt to come off.

Also, when a filler material 353 is filled up in the guide bar body 350, stage gap may be produced between the surface of the guide bar body 350 and the surface of the filler materials 353. If such a stage gap is produced, the working efficiency is spoiled in the working. Therefore, the stage gap has been conventionally eliminated by surface grinding or surface cutting. However, this work for surface grinding or surface cutting needs much cost, and it is not economical, too.

SUMMARY OF THE INVENTION

It is therefore an object of the invention to provide a guide bar for a chain saw, by which the working efficiency of the chain saw can be much increased, sufficiently attempting the lightening of the weight thereof with sufficient strength and rigidity secured, and furthermore by which such inconvenience as come-off and warping of the weight-lightening materials can be prevented in advance.

It is another object of the invention to provide a guide bar for a chain saw, by which the working efficiency is not spoiled due to the contacting resistance with a workpiece to be cut by that the filler material thereof is warped and swells out from the side of the guide bar.

It is still another object of the invention to provide a guide bar for a chain saw, of which filler material hardly comes off.

It is further another object of the invention to provide a guide bar for a chain saw, with which the working efficiency is not spoiled in use by stage gaps produced on the side of the guide bar and which is cheap in the production cost.

It is the other object of the invention to provide a guide bar for a chain saw, with which the working efficiency is not spoiled even though a cheap filler material having water or humidity sucking property and contractible in solidification is filled up in dents by a simplified way of filling.

The first inventive point of the invention aims at a guide bar which consists of one or two plate members, wherein a plurality of dents are provided by turns at both the sides thereof, reinforcement portions are formed between adjacent dents thereof, the dents which correspond to each other on both the sides thereof communicate with each other and respective dents thereof are filled up with weight lightening materials.

The second inventive point of the invention aims at a guide bar for a chain saw which consists of three or more plate members which are overlapped and fixed altogether, wherein a plurality of through holes are provided by turns on both the sides thereof, reinforcement portions are formed between adjacent through holes, an inner plate which is put between the outer side plates is provided with communicating holes by which through holes corresponding to each other on both the side plates communicates with each other, respectively, and each of through holes is filled up with weight-lightening materials.

The third inventive point of the invention aims at a guide bar for a chain saw, wherein a stage gap portion is formed on the inner circumference of the dents of the guide bar described in the first inventive point of the invention.

The fourth inventive point of the invention aims at a guide bar for a chain saw, wherein a stage gap portion is formed by protruding or sinking the edge portion of the communicating holes in the through hole on both the side plates in the guide bar for a chain saw described in the second inventive point of the invention.

The fifth inventive point of the invention aims at a guide bar for a chain saw, wherein the weight lightening material is a vibration absorbing member having a vibration absorbing property in the guide bar for a chain saw described in the first through the fourth inventive points of the invention.

The sixth inventive point of the invention aims at a guide bar for a chain saw, which is provided with oil supplying port and oil discharging ports, wherein oil passages connecting between the oil supplying ports and the oil discharging portions are provided in respective dents communicated with each other, in the guide bar for a chain saw described in the first inventive point of the invention.

The seventh inventive point of the invention aims at a guide bar for a chain saw, which is provided with oil supplying ports and oil discharging ports, wherein oil passages connecting between the oil supplying ports and the oil discharging portions are provided in respective through holes communicated with each other and communicating holes, in the guide bar for a chain saw described in the second inventive point of the invention.

In order to accomplish the above objects, the eighth inventive point of the invention aims at that dent portions are formed at one side, a filler material is filled up in the dent portions, and come-off preventing means is provided in the vicinity of the middle of the filler material.

The ninth inventive point of the invention aims at that dent portions are provided at one side, a solid type filler material is provided in the dent portions and a hardening portion is provided between the dent portions and the solid type filler material.

The tenth inventive point of the invention aims at that a film-like material is provided at the sides.

In order to accomplish the above objects, the eleventh inventive point of the invention aims at that the guide bar body and the filler material are covered with a waterproof film in the guide bar for a chain saw, described in the first inventive point of the invention, in which dent portions are formed at the sides and respective dent portions are filled up with filler materials.

The twelfth inventive point of the invention aims at that the guide bar body and the filler materials are coated with or impregnated with a water repellent paint, in the guide bar for a chain saw, in which dent portions are formed at the sides and respective dent portions are filled up with a filler material.

BRIEF DESCRIPTION OF THE DRAWINGS

The features of the present invention that are believed to be novel are set forth with particularity in the appended claims. The invention, together with further objects and advantages thereof, may best be understood with reference to the following description taken in conjunction with the accompanying drawings in which;

DETAILED DESCRIPTION OF THE PREFERRED EMBODIMENTS

FIRST EXAMPLE OF THE EMBODIMENTS

With reference to FIG. 1 through FIG. 5, the ensuing description explains the first example of the embodiments in which the invention is embodied to an integral type guide bar.

Figure 2:
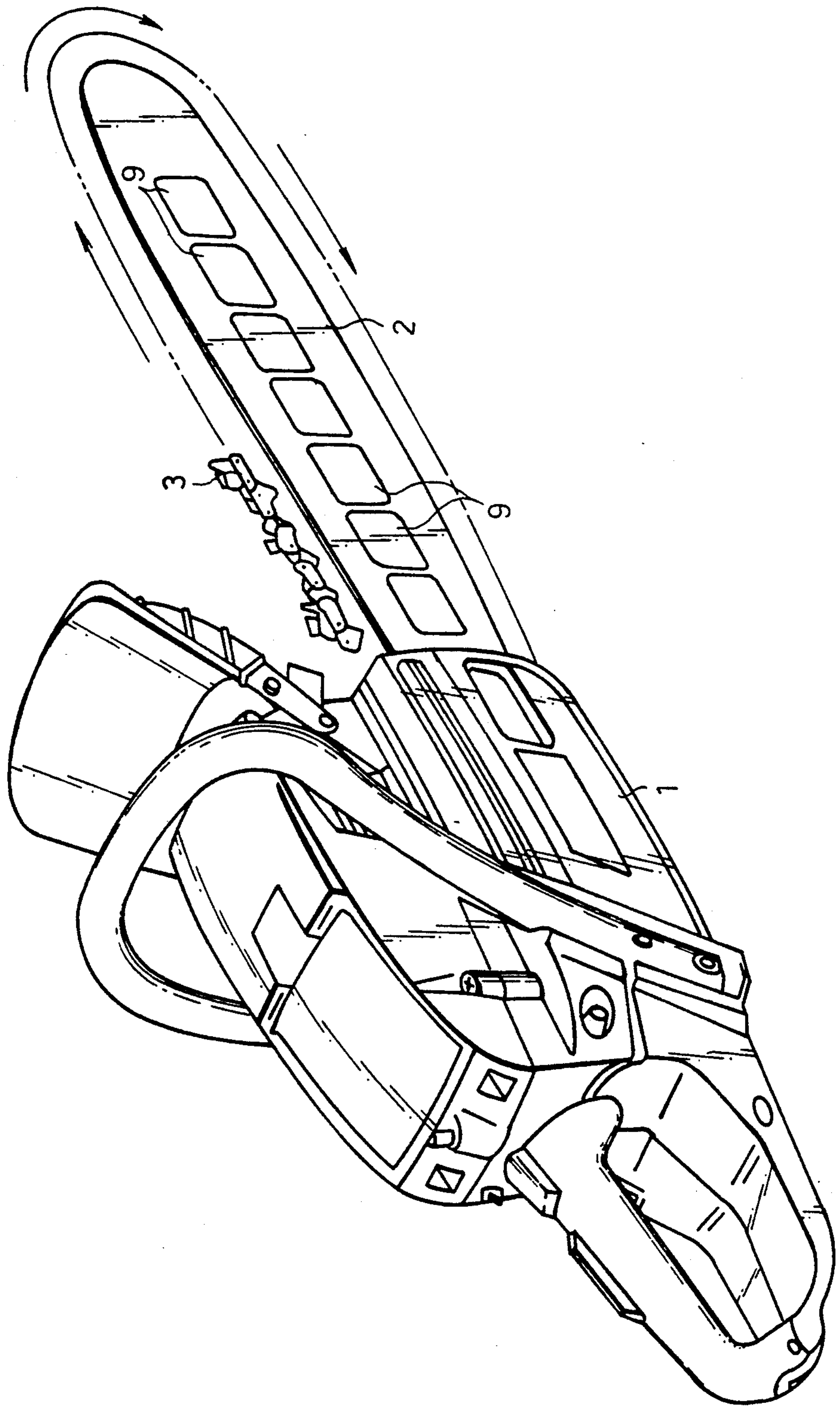
FIG. 2 is a perspective view of a chain saw.

As shown in FIG. 2, the body 1 of a chain saw is provided with a plate-like metal-made guide bar 2, and an endless saw chain is mounted on the outer circumference of the guide bar 2. The saw chain 3 is so composed that it can travel on the outer circumference of the guide bar 2 by an engine (not illustrated) built in the body 1 of the chain saw.

Figure 1:
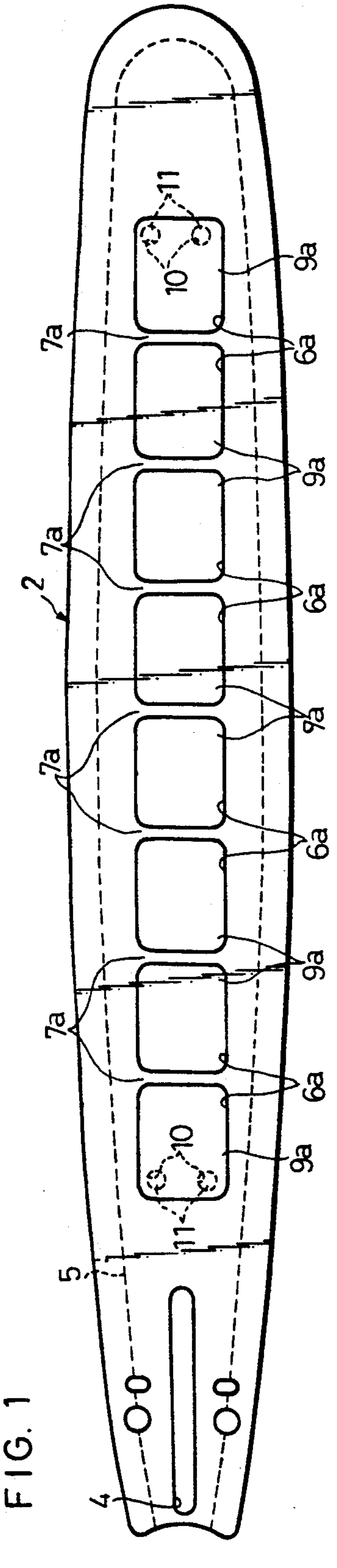
FIG. 1 is the front elevation view of a guide bar according to the first example of the embodiments of the invention.

As shown in FIG. 1, the guide bar 2 according to the embodiment is made of one plate-like member. At the base end portion thereof, a mounting hole 4 is formed in order to mount the guide bar 2 at the body 1. And a guide groove 5 is formed on the circumference of the guide bar 2 to guide the saw chain 3.

Figure 3:
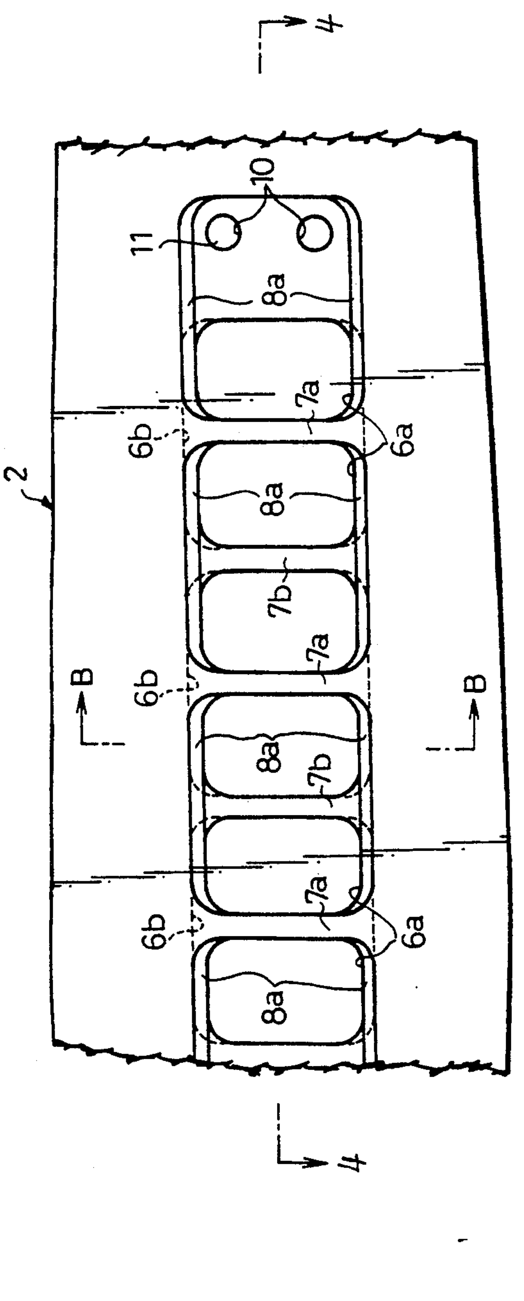
FIG. 3 is a partially enlarged front elevation view of a guide bar before filling up with synthetic resin.
Figure 4:
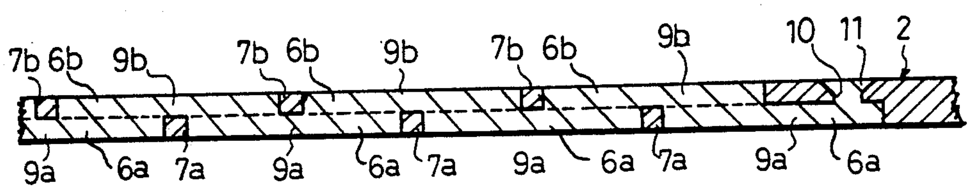
FIG. 4 is a sectional view taken along with the line 4—4 in FIG. 3, showing a guide bar after having filled up with synthetic resin.
Figure 6:
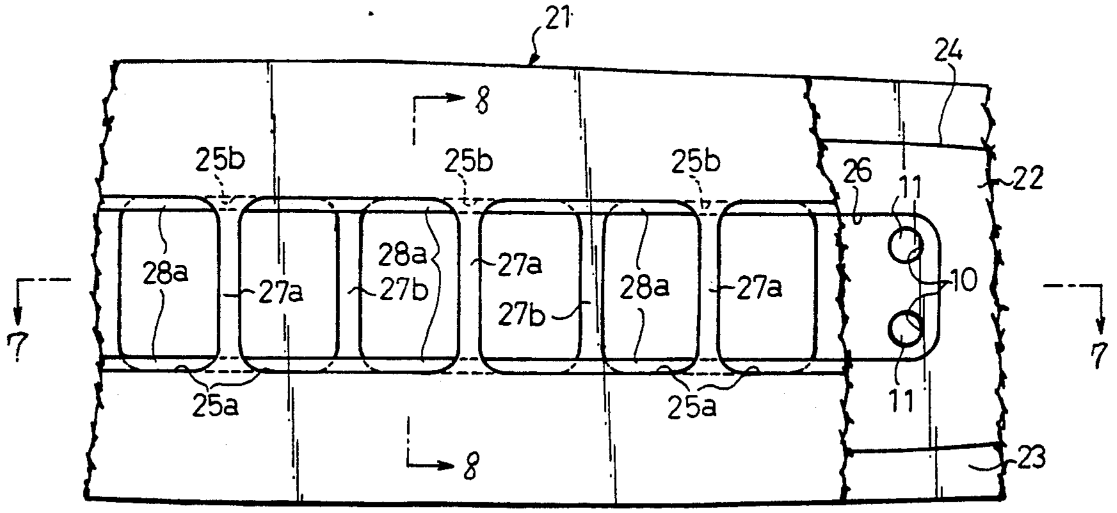
FIG. 6 is a partially enlarged front elevation view of a guide bar according to the second example of the embodiments of the invention before filling up with synthetic resin.

As best seen in FIG. 1, a plurality of substantially rectangular dents (first recesses) *6a* are formed in a first side of the guide bar 2. The dents *6a* are spaced apart and extend serially in the longitudinal direction of the guide bar, thus forming a series of reinforcement parts *7a* in the first side of the guide bar 2. Similarly, a second set of similarly shaped dents (second recesses) *6b* are formed in the opposite side of the guide bar. (FIGS. 3 and 4). The second set of dents *6b* likewise form reinforcement parts *7b* in the second side of the guide bar. Importantly, the dents *6a* in the first side of the guide bar 2 are offset relative to dents *6b* in the second side. Thus, the reinforcement parts *7a* and *7b* are similarly offset.

Figure 5:
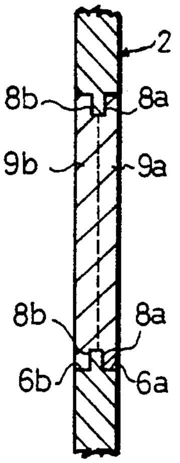
FIG. 5 is a sectional view taken along with the line 5—5 in FIG. 3, showing a guide bar after having filled up with synthetic resin.

The dents *6a* and *6b* each extend half way through the guide bar 2. Thus, in the sections where they overlap, they combine to form an opening (through hole) that extends entirely through the guide bar 2. Since the reinforcement parts *7a*, *7b* do not overlap and since the dents *6a*, *6b* extend half way through the guide bar, the reinforcement parts always have a thickness that is one half the depth of the guide bar. (See FIG. 4). Thus, the reinforcement parts *7a*, *7b* form half height support ribs that reinforce the lateral edges of guide bar 2. respective dents *6a* and *6b*. Then, synthetic resin is filled up in respective dents *6a* and *6b* as weightlightening material. The synthetic resin is flush with the outside surface of the guide bar 2, respectively. The synthetic resin in each of the dents *6a* and *6b* constitutes a filler piece *9a* and *9b*, respectively. As mentioned above, as each of the dents *6a* and *6b* communicates with each other in the guide bar 2, each of the filler pieces *9a* and *9b* is linked with each other and becomes integral. The filler piece *9a* and *9b* are mutually linked at the part where respective dents *6a* and *6b* are overlapped, i.e., at the through holes to cause both of them to have the same thickness as that of the guide bar 2. As shown in FIG. 4, each of the filler pieces *9a* and *9b* so composed to be integral therewith is held by means of the reinforcement portions *7a* and *7b* which are located to be in a zigzag relation therewith, so that they can not be broken away from the guide bar 2. As shown in FIG. 5, the filler pieces *9a* and *9b* are prevented from moving from one side of the guide bar 2 to the other side thereof (i.e., movements in the right and left direction) by means of the stage gap portions *8a* and *8b*.

As shown in FIG. 3, and FIG. 4, a pair of the come-off preventing holes 10 is provided at the dents *6a* and *6b* at the base end portion and the leading edge portion of the guide bar 2, respectively. Synthetic resin is filled up in this come-off preventing hole 10 to cause the come-off preventing portion 11 to be formed. The opening of respective come-off portions 10 at the outside of the guide bar 2 is chamfered, thereby causing the filler piece *9a* which is continued to the come-off preventing portion 11 to be prevented from inside of the dents *6a*.

In a guide bar 2 so composed as shown in the above, a number of dents *6a* and *6b* are formed. Furthermore, each of the dents *6a* and *6b* is filled up with light-weighed synthetic resin. Therefore, this type of a guide bar is remarkably light in comparison with a guide bar on which any of dents *6a* and *6b* is not provided, and the working efficiency of the chain saw can be much increased.

Furthermore, reinforcement parts *7a* and *7b* are formed at both the sides of each of the dents *6a* and *6b*, respectively. Therefore, even though the guide bar is so light-weighed as shown in the above, the strength and rigidity of the guide bar may not be lowered. Therefore, it is possible to prevent the working efficiency from being lowered due to deflection of the guide bar 2 in use and to prevent the cutting surface from being roughened due to vibrations of the guide bar 2 in accompanying with vibrations of the engine. The guide bar 2 is heat-treated in production. However, as the reinforcement portions *7a* and *7b* reinforces the guide bar 2 as shown in the above, it is possible to prevent the guide bar 2 from strain due to heat treatment.

As mentioned in the above, respective filler pieces *9a* and *9b* are integral with each other and are supported in the guide bar 2 by means of respective reinforcement portions *7a* and *7b*. For this reason, there is no case that these filler pieces *9a* and *9b* may slip off from inside of the dents *6a* and *6b*. Furthermore, as shown in FIG. 4, the thickness of the filler pieces *9a* and *9b* is equivalent to the thickness of the guide bar 2, excluding the parts which correspond to the reinforcement portions *9a* and *9b*. Therefore, the filler pieces *9a* and *9b* are scarcely warped. Thereby there is no case that the edge portion of the filler pieces *9a* and *9b* is protruded from both the sides of the guide bar 2 due to warping of the filler pieces *9a* and *9b*.

Hence, when filling up the dents *6a* and *6b* in the guide bar 2 with synthetic resin, respective dents *6a* and *6b* are clogged. After that, melted synthetic resin is injected in optional dents 6a and 6b in the guide bar 2 and completely spreads all over the dents 6a and 6b. As shown in FIG. 4, as the reinforcement portions 7a and 7b are so located to be zigzag-like, the melted synthetic resin which has been injected only flows in zigzag. It is not branched or joined. Generally, it is not recommended in the injection molding of synthetic resin that melted synthetic resin is branched and joined again. This is because the joined portion of melted resin is not completely united and there may cause a possibility of peeling-off as weld lines are caused to be produced. As mentioned in the aboves, the melted resin does not join in the guide bar 2 according to the embodiment, thereby causing no peeling-off to occur due to weld lines and causing tough filler pieces 9a and 9b to be molded.

SECOND EXAMPLE OF THE EMBODIMENTS

Next, the second example of the embodiments of the invention, in which a mating type guide bar is embodied, is explained hereinafter;

The guide bar 21 according to this example of the embodiment consists of an inner plate 22 and a pair of side plates 23a and 23b. The side plates 23a and 23b are mated with the inner plate 22 and fixed at both the sides thereof, respectively. The inner plate 22 is a little smaller in size than the side plates 23a and 23b. The stage gap formed by these members 22, 23a and 23b functions as guide groove 24 for guiding the saw chain 3.

A number of square-like through holes 25a and 25b are arranged with equal interval in the lengthwise direction on both the side plates 23a and 23b. The through holes 25a and 25b at both the sides 23a and 23b slip by half pitch, respectively. In other words, respective through holes 25a and 25b are located between the opposite through holes 25a and 25b.

A communicating hole 26 which extends in the lengthwise direction is formed on the inner plate 22 so that it can communicate with all the through holes 25a and 25b of the side plates 23a and 23b. Respective through holes 25a and 25b at both the side plates communciate with each other by the communicating hole 26. The part where respective through holes 25a, 25b and the communicating hole 26 are overlapped constitutes a through hole. The part between respective through holes 25a and 25b constitutes reinforcement portions 27a and 27b. As mentioned aboves, as the through holes 25a and 25b at both the sides are arranged alternately, respective reinforcement portion 27a and 27b are so located as to be zigzag-like.

The vertical width of the communicating hole of the inner plate 22 is so set as to be slightly narrow in comparison with the vertical width of the through holes 25a and 25b at both the side plates 23a and 23b. Therefore, the upper and lower edges of the communicating hole 26 are protruded into respective through holes 25a and 25b, thereby causing stage gap portions 28a and 28b to be formed. As well as the guide bar according to the first example of the embodiment, synthetic resin is filled up in respective through holes 25a and 25b of both the side plates 23a and 23b and in the communicating hole 26 of the inner plate 22 as weight-lightening material. The synthetic resin is so made as to be flush with the outside surface of the guide bar 21, respectively.

Figure 7:
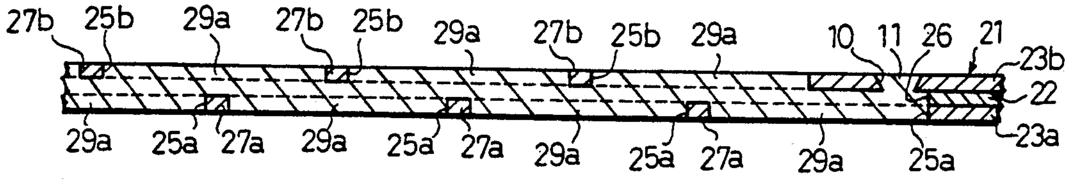
FIG. 7 is a sectional view taken along with the line 7—7 in FIG. 6, showing a guide bar after having filled up with synthetic resin.
Figure 8:
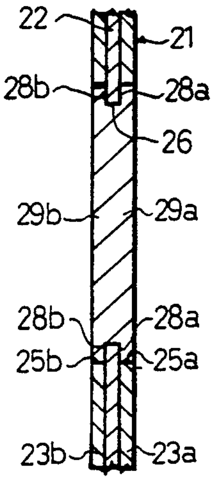
FIG. 8 is a sectional view taken along with the line 8—8 in FIG. 6, showing a guide bar after having filled up with synthetic resin.

The synthetic resin in the through holes 25a and 25b constitutes filler pieces 29a and 29b, respectively. Each of the filler pieces 29a and 29b are linked with each other in the guide bar 21 and becomes integral with each other. The part where respective through holes 25 and 25b and the communicating hole 26 are overlapped, i.e., at the through holes, the filler pieces 29a and 29b are linked with each other and both of them are made to be of the same thickness as that of the guide bar 2. As shown in FIG. 7, respective filler pieces 29a and 29b which are integrally composed are held by the reinforcement portions 27a and 27b located to be in a zigzag relation therewith, so that they can not be broken away from the guide bar 21. As shown in FIG. 8, the filler pieces 29a and 29b are prevented from moving from one end to the other end of the guide bar 21 (movement in the right and left direction) by means of the stage gap portions 28a and 28b.

The guide bar according to the second example of the embodiment is provided with a come-off preventing hole 10 (only the leading edge is illustrated) as well as the guide bar according to the first example of the embodiment, and the hole 10 prevents the filler pieces 29a and 29b from coming off outwardly.

The guide bar 21 so composed as shown in the above brings us the same actions and effects as those of the first example of the embodiment.

THIRD EXAMPLE OF THE EMBODIMENTS

Figure 9:
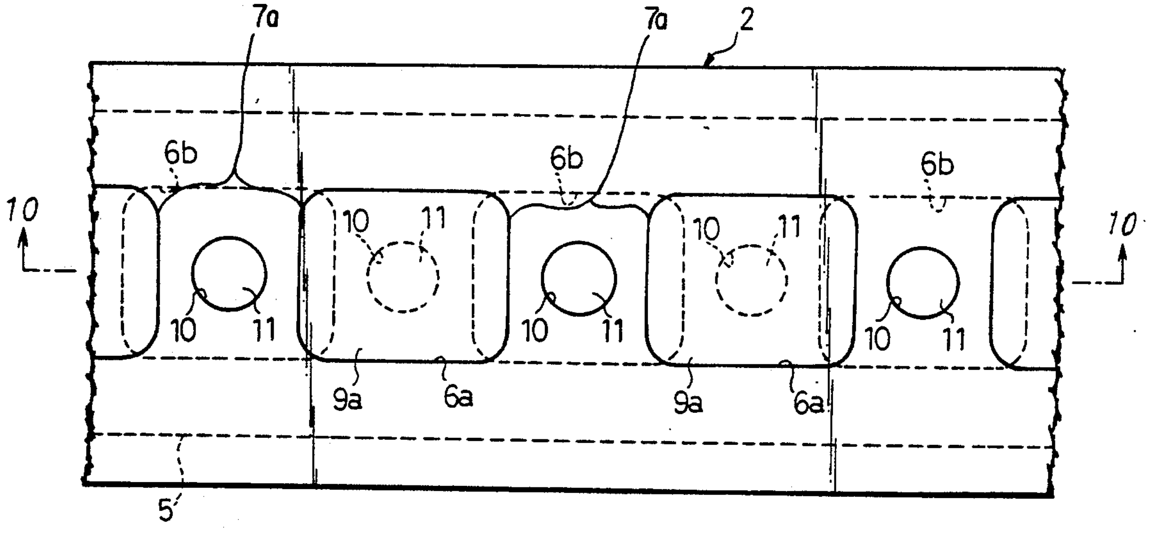
FIG. 9 is a partially enlarged front elevation view of a guide bar according to the third example of the embodiments of the invention.
Figure 10:
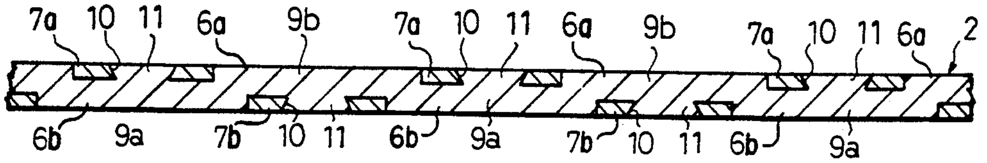
FIG. 10 is a sectional view taken along with the line 10—10 in FIG. 9.

As shown in FIG. 9 and FIG. 10, in the guide bar according to the third example of the embodiment, the reinforcement portions 7a and 7b are so composed as to be wider than the width of those in the first example of the embodiment. Each of the reinforcement portions 7a and 7b is provided with a come-off preventing hole 10. Each come-off preventing hole 10 is filled up with synthetic resin, thereby causing a come-off preventing portion 11 to be formed.

In the third example of the embodiment, the weight lightening material may be synthetic rubber or synthetic resin, etc. having a vibration absorbing effect. In this case, as the contacting area between the member having a vibration absorbing effect and the reinforcement portions 7a and 7b is large, the vibration absorbing effect is increased, too.

FOURTH EXAMPLE OF THE EMBODIMENTS

Figure 11:
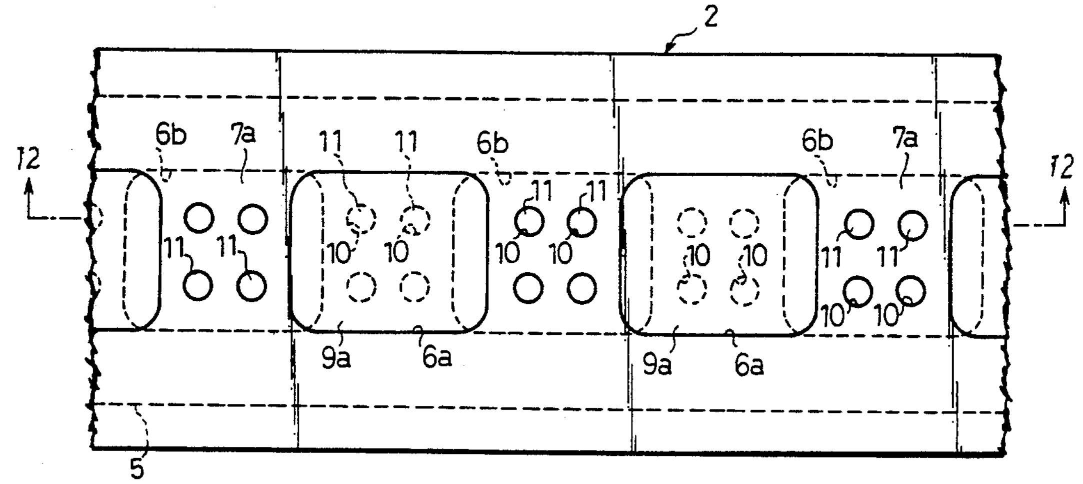
FIG. 11 is a partially enlarged front elevation view of a guide bar according to the fourth example of the embodiments of the invention.
Figure 12:
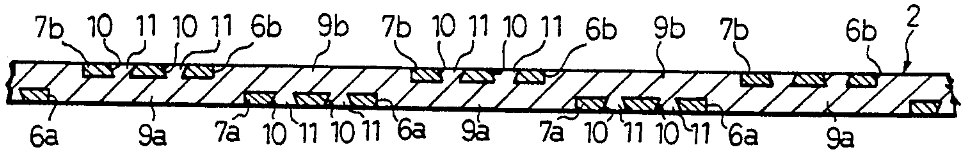
FIG. 12 is a sectional view taken along with the line 12—12 in FIG. 11.

As shown in FIG. 11 and FIG. 12, the guide bar according to the fourth example of the embodiment is provided with two come-off preventing holes 10 and two come-off preventing portions 11, respectively.

FIFTH EXAMPLE OF THE EMBODIMENTS

Figure 13:
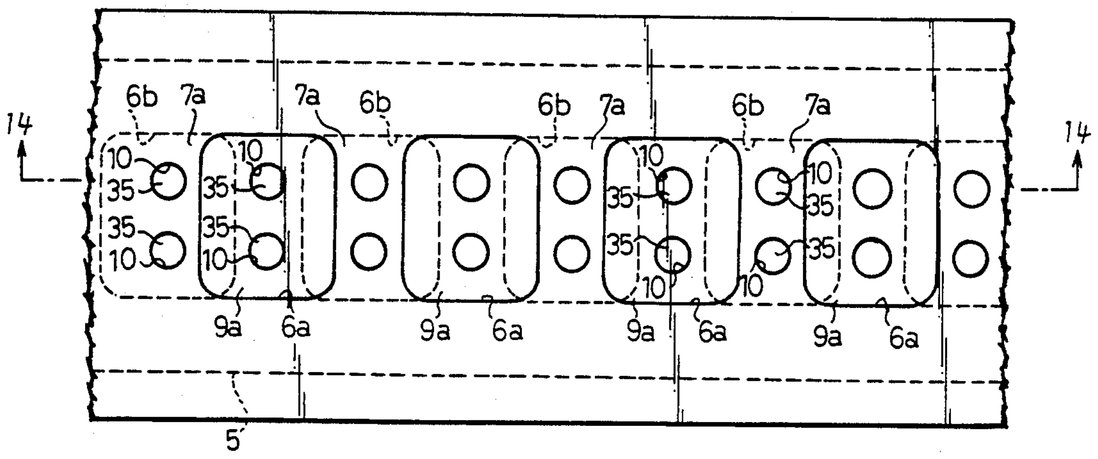
FIG. 13 is a partially enlarged front elevation view of a guide bar according to the fifth example of the embodiments of the invention.
Figure 14:
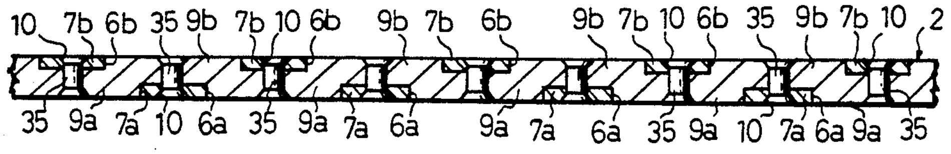
FIG. 14 is a sectional view taken along with the line 14—14 in FIG. 13.

As shown in FIG. 13 and FIG. 14, in the guide bar according to the fifth example of the embodiment, the reinforcement portions 7a and 7b are so composed as to be wider than the width of those in the first example of the embodiment. Each of the reinforcement portions 7a and 7b is provided with two come-off preventing holes 10 at both the upper and the lower parts thereof, respectively. A rivet 35 is inserted into each come-off preventing hole 10 and dents 6a and 6b, thereby causing the filler pieces 9a and 9b to be secured in a position.

SIXTH EXAMPLE OF THE EMBODIMENTS

Figure 15:
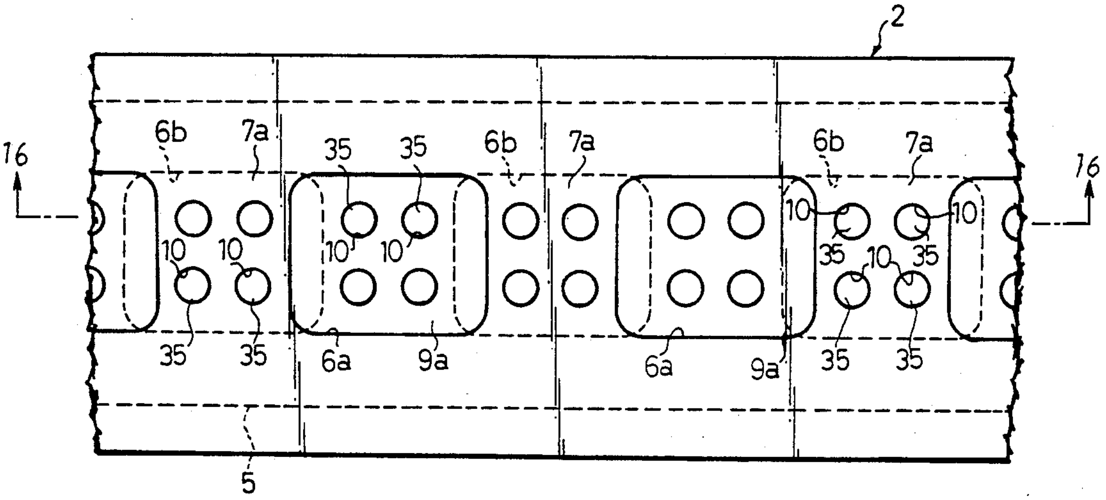
FIG. 15 is a partially enlarged front elevation view of a guide bar according to the sixth example of the embodiments of the invention.
Figure 16:
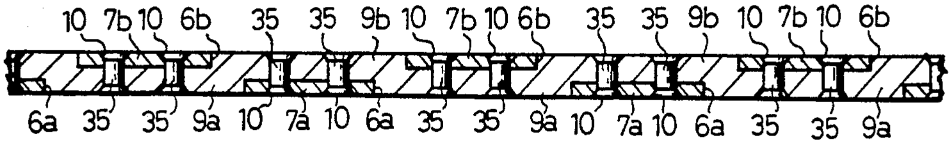
FIG. 16 is a sectional view taken along with the line 16—16 in FIG. 15.

As shown in FIG. 15 and FIG. 16, the guide bar according to the sixth example of the embodiments is provided with two come-off preventing holes and rivets 35 at both the upper and the lower parts thereof, respectively.

SEVENTH EXAMPLE OF THE EMBODIMENTS

Figure 17:
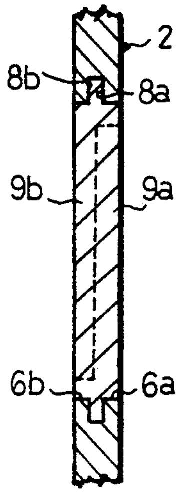
FIG. 17 is a partially sectional view of a guide bar according to the seventh example of the embodiments of the invention.

In a guide bar 2 according to the first example of the embodiment, the stage gap portions 8a and 8b are so formed as to be protruded into the dents 6a and 6b. However, as shown in FIG. 17, contrarily, the stage gap portions 8a and 8b are so formed as to be concave in the dents 6a and 6b in the guide bar according to the seventh example of the embodiment.

Also, the same construction as that of the seventh example of the embodiment may be embodied in the guide bar 2 in the third to the sixth examples of the embodiments.

EIGHTH EXAMPLE OF THE EMBODIMENTS

Figure 18:
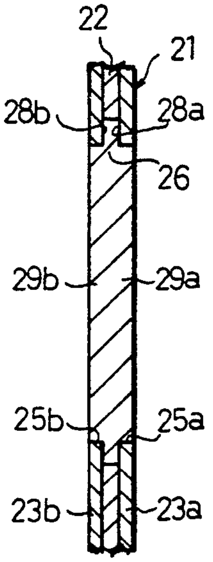
FIG. 18 is a partially sectional view of a guide bar according to the eighth example of the embodiments of the invention.

In the guide bar 21 according to the second example of the embodiments, the stage gap portions 28a and 28b are so formed as for the upper and the lower edges of the communicating hole 26 of the inner plate 22 to be protruded in the through holes 25a and 25b of the side plates 23a and 23b. However, as shown in FIG. 18, in the guide bar according to the eight example of the embodiments, contrarily, the stage gap portions 28a and 28b are formed so that the upper and the lower edges of the communicating hole 26 can go down in the through holes 25a and 25b.

NINTH EXAMPLE OF THE EMBODIMENTS

Figure 20:
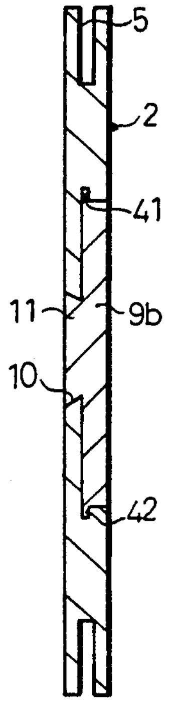
FIG. 20 is a sectional view taken along with the line 20—20 in FIG. 19.
Figure 19:
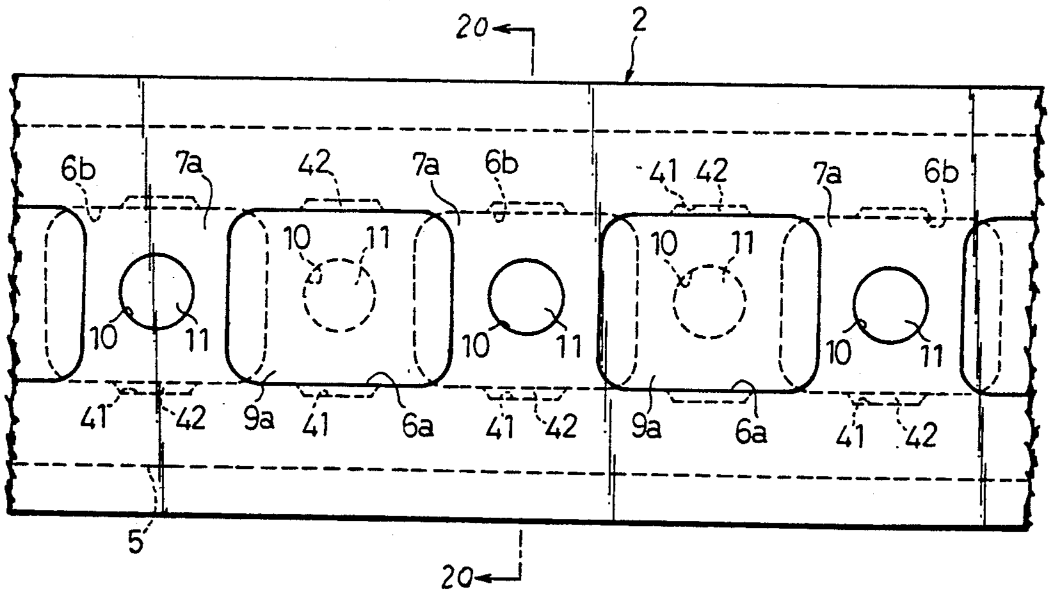
FIG. 19 is a partially enlarged front elevation view of a guide bar according to the ninth example of the embodiments of the invention.

As shown in FIG. 19 and FIG. 20, in the guide bar according to the ninth example of the embodiment, the vertical portion of the inner bottom side of respective dents 6a and 6b of the guide bar according to the third example of the embodiment is enlarged and formed to be an engaging dent 41. Furthermore, the vertical portion of the bottom side of respective filler pieces 9a and 9b which can correspond to the engaging dents 41 is enlarged and formed to be another engaging projection 42.

TENTH EXAMPLE OF THE EMBODIMENTS

Figure 22:
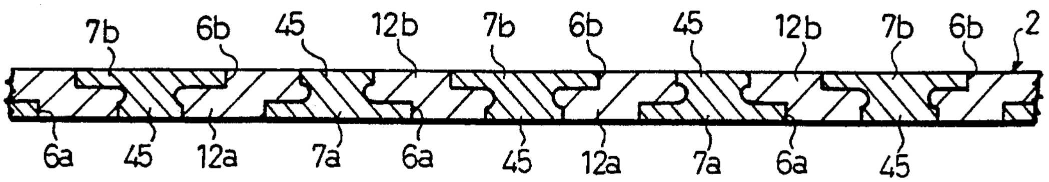
FIG. 22 is a sectional view taken along with the line 22—22 in FIG. 21.
Figure 23:
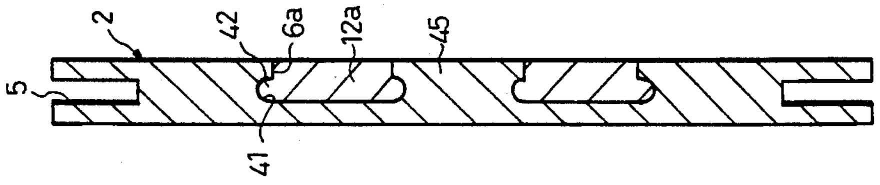
FIG. 23 is a sectional view taken along with the line 23—23 in FIG. 21.
Figure 21:
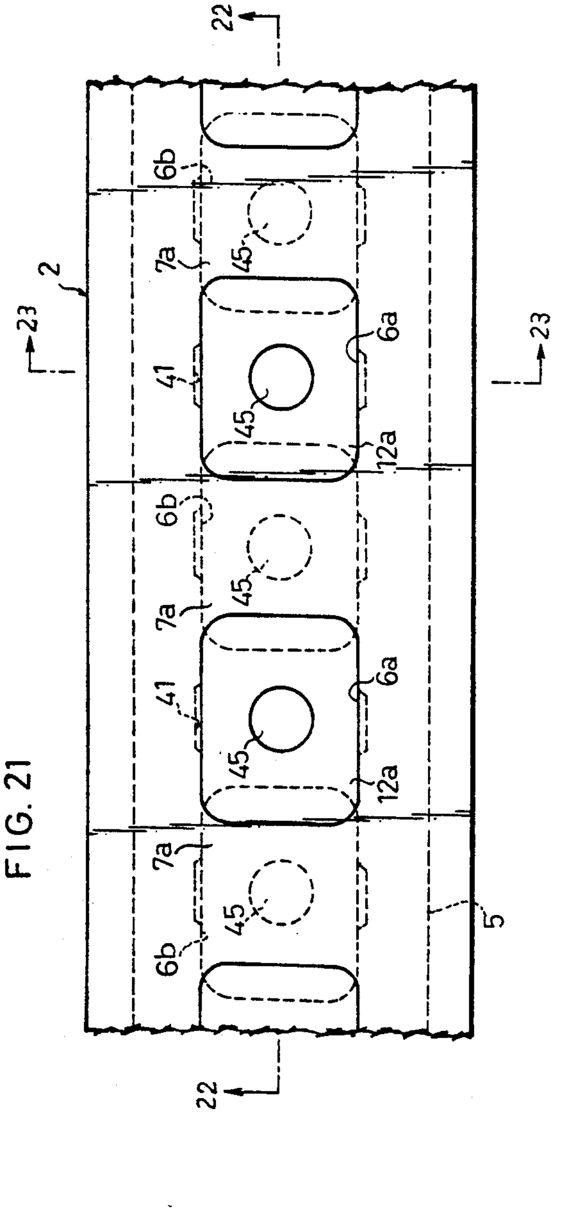
FIG. 21 is a partially enlarged front elevation view of of a guide bar according to the tenth example of the embodiments of the invention.

As shown in FIG. 21, FIG. 22 and FIG. 23, in the guide bar according to the tenth example of the embodiments, the profile of the engaging dent 41 and the engaging projection 42 of the guide bar according to the ninth example of the embodiment is changed. That is, the angle formed by the inner bottom face of the dents 6a and 6b and the inner side face successive therefrom is an obtuse angle. In addition, the same inner side face is of curvature. Also, a come-off preventing projection 45 is secured at the reinforcement portion 7a and 7b instead of the come-off preventing hole 10. The circumference of this come-off preventing projection 45 is made concave at the inner bottom face of the dents 6a and 6b. The filler materials 12a and 12b which are filled up in respective dents 6a and 6b are so shaped as to correspond to the concave portion the come-off preventing projection 45.

In this example of the embodiment, as the angle formed by the inner bottom side of the dents 6a and 6b and the inner side successive therefrom is an obtuse angle, the guide bar 2 is not cracked when carrying out heat treatment.

ELEVENTH EXAMPLE OF THE EMBODIMENTS

Figure 24:
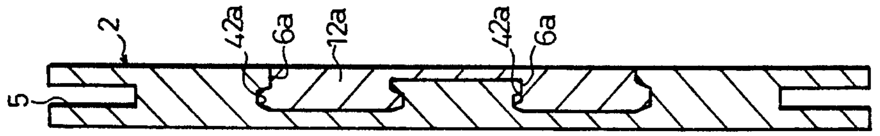
FIG. 24 is a sectional view of a guide bar according to the eleventh example of the embodiments of the invention.

As shown in FIG. 24, in the guide bar according to the eleventh example of the embodiments, the profile of the engaging dent 41 and the engaging projection 42 of the guide bar according to the tenth example of the embodiments is changed. That is, the angle formed by the inner bottom face of the dents 6a and 6b and the inner side face 42a successive therefrom is an obtuse angle. Moreover, the same inner side face 42a is horizontal.

TWELFTH EXAMPLE OF THE EMBODIMENT

Figure 25:
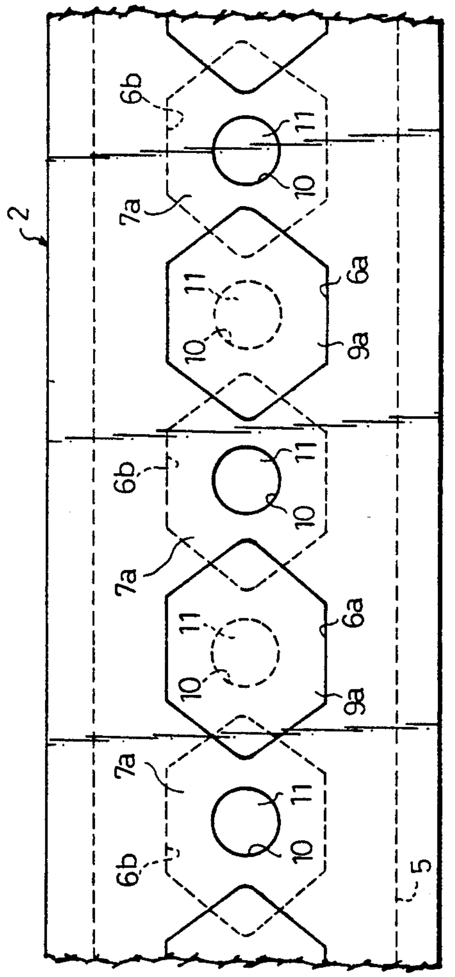
FIG. 25 is a partially enlarged front elevation view of a guide bar according to the twelfth example of the embodiments of the invention.
Figure 26:
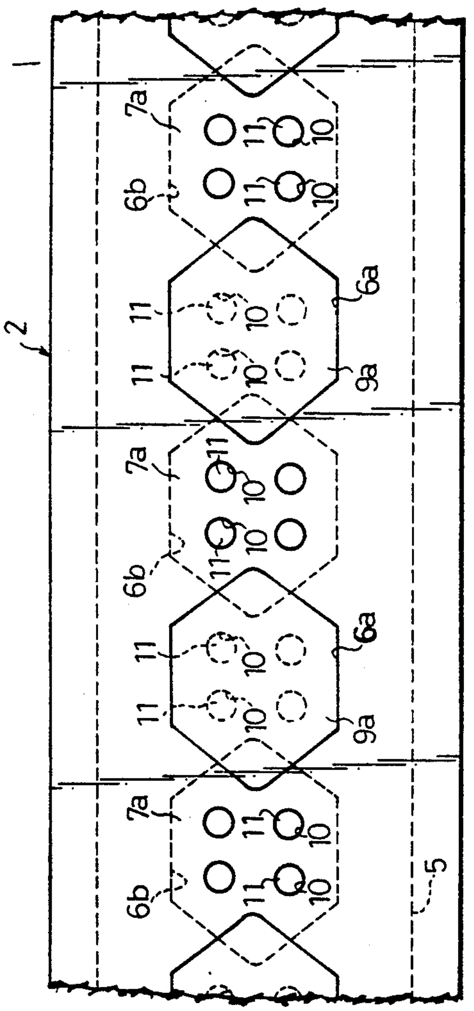
FIG. 26 is a partially enlarged front elevation view of a guide bar according to another type of the twelfth example of the embodiments of the invention.

As shown in FIG. 25 and FIG. 26, in the guide bar according to the twelfth example of the embodiments, respective dents 6a and 6b of the guide bar according to the third and the fourth examples of the embodiments are made roughly hexagonal in shape. The length in the vertical direction of the through hole portion where respective dents 6a and 6b are overlapped is short and the area of the through hole portion is made narrow.

In the case of this example of the embodiments, the strength of the guide bar 2 against bending is increased.

THIRTEENTH EXAMPLE OF THE EMBODIMENTS

Figure 27:
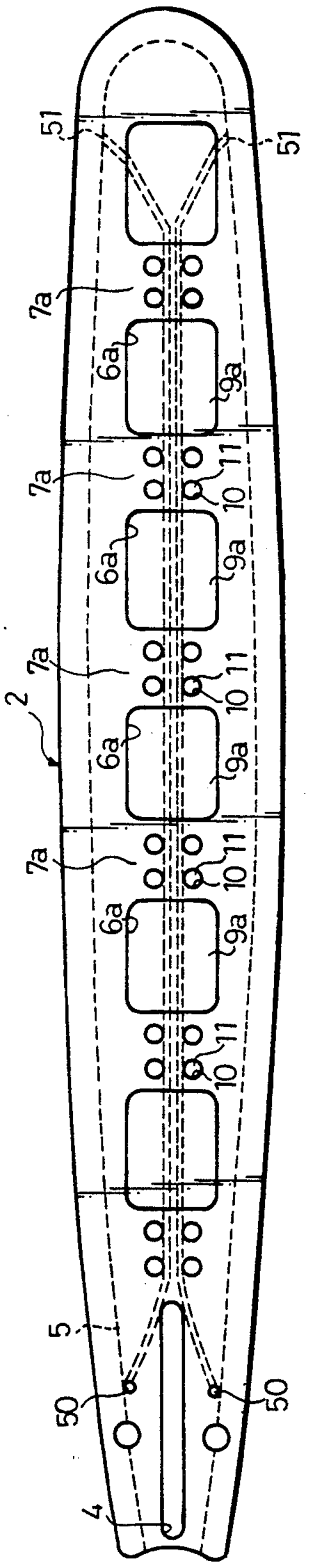
FIG. 27 is the front elevation view of a guide bar according to the thirteenth example of the embodiments of the invention.
Figure 28:
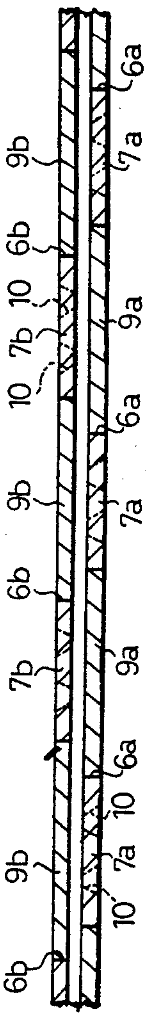
FIG. 28 is a partially sectional view in FIG. 27.

As shown in FIG. 27 and FIG. 28, in the guide bar according to the thirteenth example of the embodiments, a pair of oil supplying ports 50 is provided vertically at the outside of the base end portion of the guide bar 2 according to the fourth example of the embodiments. Moreover, a pair of oil discharging portions 51 is also provided on the guide groove 5 at the leading edge portion. A tubular oil passage 52 by which the upper oil supplying port 50 is connected to the upper oil discharging port 51 and the lower oil supplying port 50 is also connected to the lower oil discharging port 51, respectively, is provided in each of the dents 6a and 6b.

In the thirteenth example of the embodiments, the dents 6a and 6b can be concurrently used as place where the oil passages 52 are secured and as place where weight lightening material is filled up. Therefore, such a construction as shown in the above is free from such a complicated structure that the oil passages 52 are separately provided, and in addition, it is easy to accommodate and fix the oil passages 52 in the guide bar 2.

The oil passages 52 may be mounted in the through holes 25a, 25b and the communicating hole 26 in the second example of the embodiments. Therefore, such a construction as being employed in this example of the embodiments can be embodied in the guide bar 21 according to the second example of the embodiments.

Also, each of the above examples of the embodiments may be embodied in a guide bar for a chain saw of sprocket nose or a roller nose, etc.

Furthermore, in each of the above examples of the embodiments, the weight lightening plate and vibration absorbing materials may be of other shape than a plate-like material. For example, granular or spherical materials can be filled up in the dents and through holes. In this case, respective dents or through holes may be covered with a covering material, so that the weight lightening materials and vibration absorbing materials may not come off.

In the guide bar according to the first, the second, the seventh, and the eighth examples of the embodiments, the stage gap portions 8a, 8b, 28a and 28b are formed in order to prevent the filler pieces 9a, 9b, 29a and 29b from coming off or slipping off. But, it is not necessarily requisite that these stage gap portions 8a, 8b, 28a and 28b are formed. Supposed that they are not formed, the guide bars 2 and 21 in each of the examples of the embodiment can have sufficient effects for preventing the come-off of the filler pieces 9*a*, 9*b*, 29*a* and 29*b*.

In the guide bars 2 and 21 according to the first through the thirteenth examples of the embodiments, synthetic resin is filled up in the dents 6*a*, 6*b* and the through holes 25*a* and 25*b* as weight-lightening material. Any kind of material can be used as weight lightening material if its specific gravity is lighter than that of the material of the guide bars 2 and 21. For example, light metal such as aluminum may be filled up in the dents 6*a*, 6*b* and the through holes 25*a*, 25*b*. Instead of filling up with synthetic resin, filler pieces 9*a*, 9*b*, 29*a* and 29*b* are molded to the shape corresponding to individual dents 6*a*, 6*b* and through holes 25*a*, 25*b* in advance. After that, these filler pieces 9*a*, 9*b*, 29*a* and 29*b* may be inserted and fixed in the dents 6*a*, 6*b* and the through holes 25*a*, 25*b*. Furthermore, the filler pieces 9*a*, 9*b*, 29*a* and 29*b* so inserted and fixed as shown in the above may be mutually welded by way of ultrasonic wave welding, etc. If so, these filler pieces 9*a*, 9*b*, 29*a*, and 29*b* are integrally united into one body, thereby causing the strength of the guide bars 2 and 21 to be increased.

In the guide bars 2 and 21 according to each of the above embodiments, each of the filler pieces 9*a*, 9*b*, 29*a*, and 29*b* may be made of such vibration absorbing members having vibration absorbing property as rubber, lead, copper, etc. In the case of such a construction as mentioned in the above, it is possible for the vibration absorbing members to absorb vibrations which may be generated when using a chain saw. Therefore, it becomes easy to operate the chain saw. In addition, personal disorder due to vibrations may be lessened, and it is possible to prevent the cutting surface from being roughened.

In the guide bars 2 and 21 according to each of the above embodiments, only a row of the dents 6*a*, 6*b* and the through holes 25*a*, 25*b* is provided. However, the number of the rows of dents and through holes may be increased to two or three rows according to the specification of the guide bars 2 and 21. Also it is possible to properly change the shape, the size of dents 6*a*, 6*b* and the through holes 25*a*, 25*b*, and the interval between respective dents 6*a* and 6*b* according to the specification of the guide bars 2 and 21.

A mating type guide bar similar to that in the second example of the embodiments may be embodied in the construction in the third to the twelfth examples of the embodiment.

In each of the above examples of the embodiments, all the dents 6*a* and 6*b* from the dents 6*a* at one end in the lengthwise direction of the guide bar to the dents 6*a* at the other end communicate with each, thereby causing a communicating space to be formed. However, for instance, the communication of all the dents 6*a* and 6*b* may be intercepted at any point thereof without providing a dent 6*b* for communicating with the two adjacent dents 6*a* or a dent 6*a* for communicating with the two adjacent dents 6*b*. Namely, the dents 6*a* and 6*b* may communicate with each other two by two or three by three.

FOURTEENTH EXAMPLE OF THE EMBODIMENT

The ensuing description explains the fourteenth example of the embodiment of the invention with reference to FIG. 29 through FIG. 35.

Figure 29:
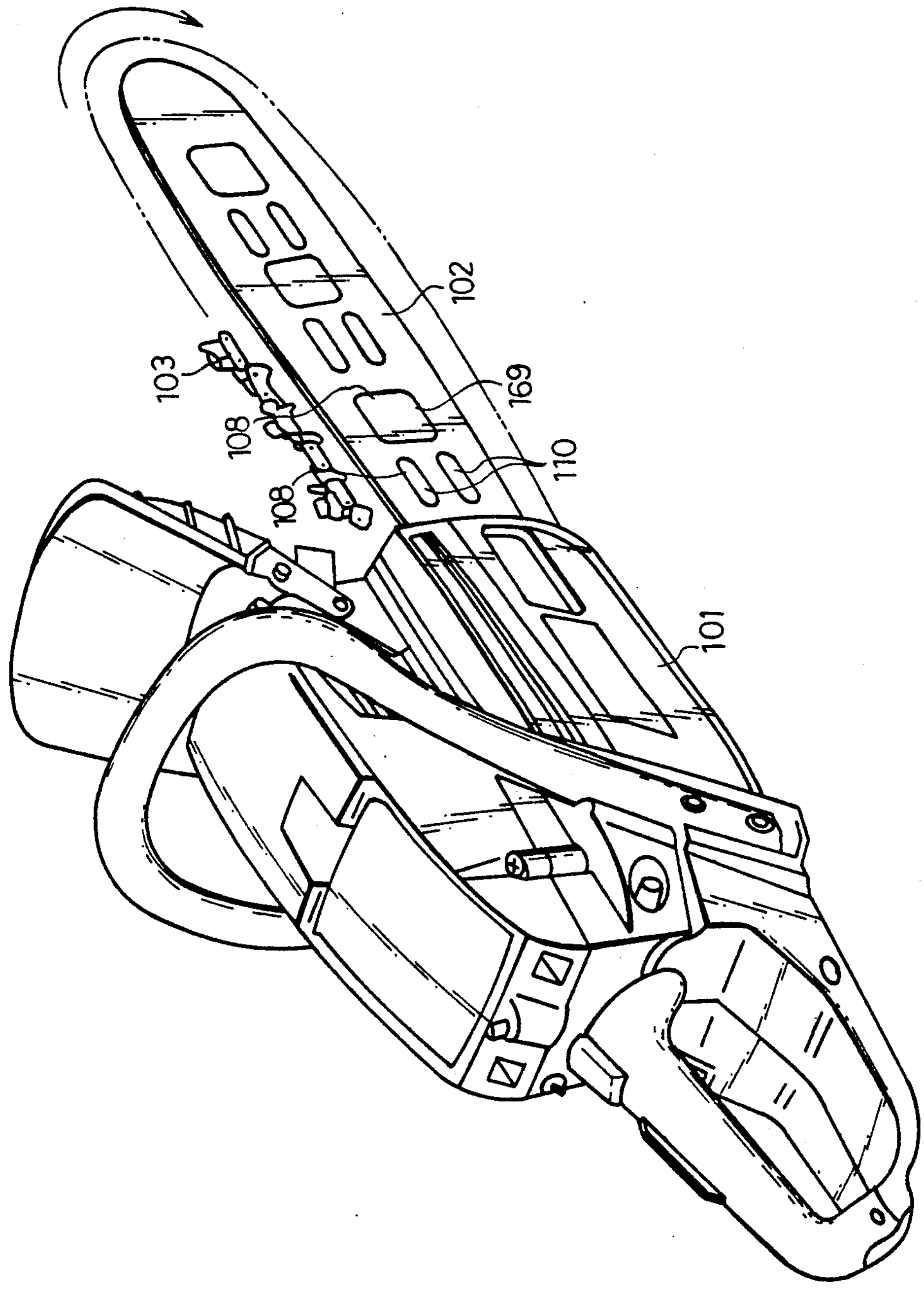
FIG. 29 is a perspective view of a chain saw in which a guide bar according to the fourteenth example of the embodiments of the invention is mounted.

As shown in FIG. 29, a plate-like metal-made guide bar body 102 is attached to the body 101 of the chain saw. An endless saw chain 103 is provided on the outer circumference of the guide bar 102.

Figure 30:
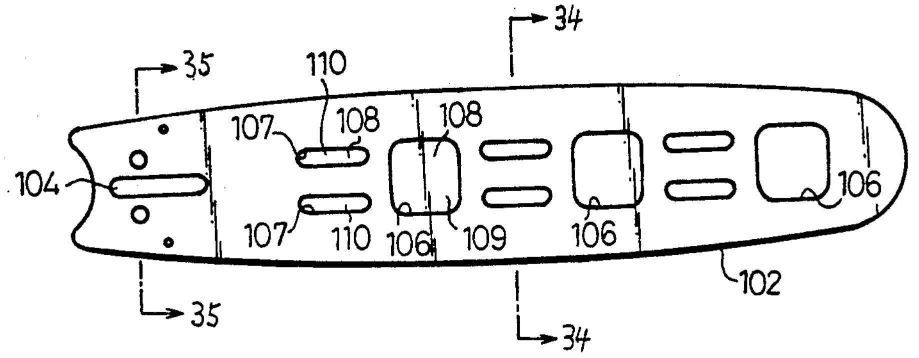
FIG. 30 is the front elevation view of a guide bar.

As shown in FIG. 30, the guide bar body 102 according to the fourteenth example of the embodiment is made of a plate-like material. The base end portion thereof is provided with a mounting hole 104 for mounting the guide bar body 102 at the chain saw body 101. A guide groove 105 is formed at the circumference of the guide bar 102 to guide the saw chain 103.

Figure 31:
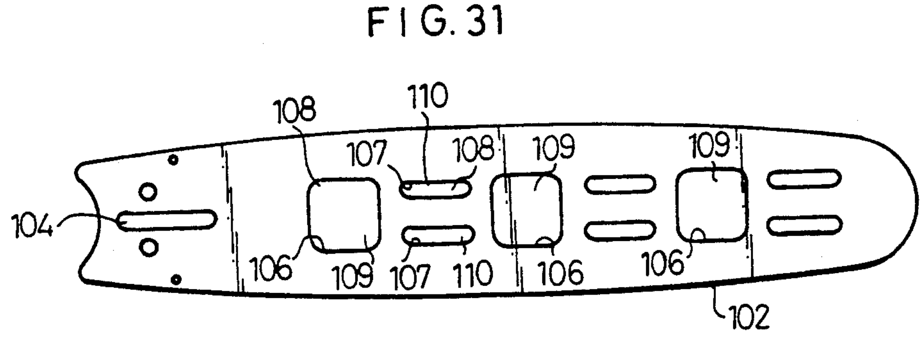
FIG. 31 is the rear elevation view of the guide bar in FIG. 30.
Figure 32:
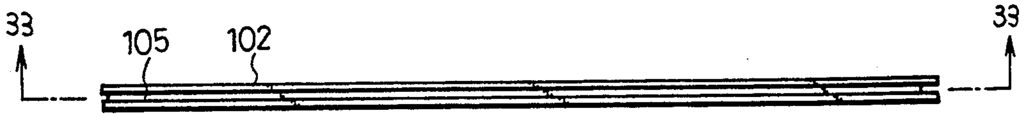
FIG. 32 is a plane view of the guide bar in FIG. 30.
Figure 33:
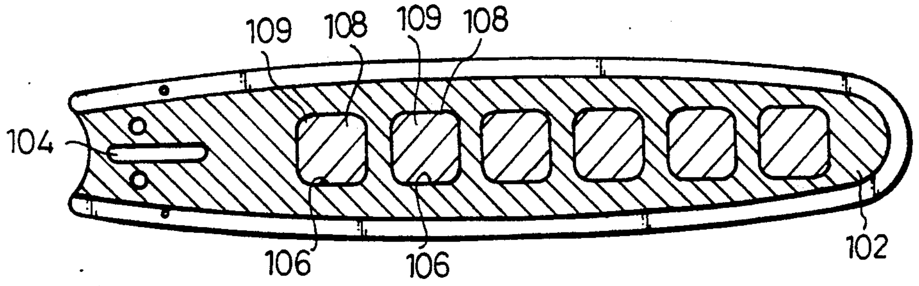
FIG. 33 is a sectional view taken along with the line 33—33 in FIG. 32.
Figure 34:
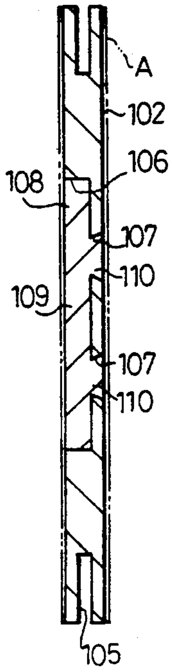
FIG. 34 is an enlarged sectional view taken along with the line 34—34 in FIG. 30.
Figure 35:
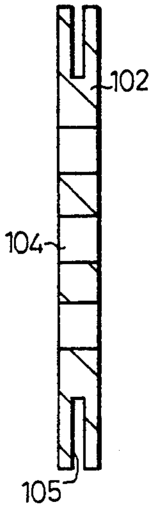
FIG. 35 is an enlarged sectional view taken along with the line 35—35 in FIG. 30.

As shown in FIG. 30, FIG. 31, and FIG. 34, roughly square-like dents 106 are arranged at both the sides of the guide bar body 102 with equal interval. A pair of come-off preventing dents 107 are vertically formed at the opposite side of the dents 106 at the position corresponding to the dents 106, so that the dents 107 may come near the middle between the dents 106, and the come-off preventing dents 107 communicate with the dents 106. The area of these come-off preventing dents 107 is smaller than that of the dents 106 and they are long and slender in the right and left direction in FIG. 30. The come-off preventing dents 107 have a tapered face which is widened outwardly. A filler material 108 made of synthetic resin is filled up in both the dents 106 and 107. The filler materials 108 consists of a filler material body positioned in the dent 106 and a come-off preventing protrusion 110 positioned in the come-off dent 107.

In this example of the embodiment, the come-off preventing protrusion 110 is engaged in the come-off preventing dent 107. Therefore, the filler material 108 does not swell out from the side by that the middle portion of the filler material 108 is floated or warping occurs in the filler material 108. As a result, the working efficiency may not remarkably be spoiled due to occurrence of the contacting resistance between the cutting surface of woods and the filler materials 108.

Also, it much better that the come-off preventing dent 107 is in the vicinity of the whole filler material 108.

The ensuing description explains the fifteenth through twenty-fifth examples of the embodiments of the invention in comparison with the fourteenth example of the embodiments thereof. All the same members as those in the fourteenth example thereof and the members corresponding to those in the fourteenth example thereof are given the same reference numbers, and the explanation thereof is omitted. Only the parts which are different from the fourteenth example of the embodiments are explained herein.

FIFTEENTH EXAMPLE OF THE EMBODIMENT

Figure 36:
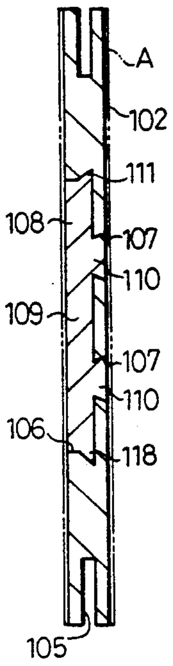
FIG. 36 is a sectional view showing a guide bar according to the fifteenth example of the embodiments of the invention.

In the guide bar 2 of the fifteenth example of the embodiments, the inner circumferential face of the inner bottom portion of the dents 106 is, as shown in FIG. 36, formed to be tapered so that it can be widened inwardly (in the right direction in FIG. 36) and constitutes an engaging dent 111. The outer circumferential face of the bottom portion side of the filler material 108 constitutes an engaging protrusion 118 corresponding to the engaging dent 111.

Therefore, in this example of the embodiments, as filler material 108 is filled up in the engaging dent 111, the come-off preventing effect can be expected at the outer circumferential edge of the filler materials 108.

SIXTEENTH EXAMPLE OF THE EMBODIMENTS

Figure 38:
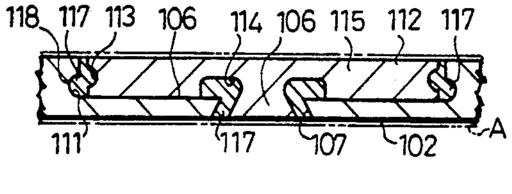
FIG. 38 is an enlarged sectional view taken along with the line in FIG. 37.

As shown in 37 and FIG. 38, the dents 106 and the come-off preventing dents 107 similar to those in the fifteenth example of the embodiments are formed in the guide bar body 102. The inner circumferential face at the inner bottom portion side of the dents 106 is slightly widened and constitutes the engaging dents 111 which surrounds the inner circumferential face. A solid type filler material 112 which is slightly smaller in size than the outer circumference of the dents 106 and the come-off preventing dents 107 is inserted in the dents 106 and the come-off preventing dents 107. The solid type filler material 112 has a solid type filler material body 115 positioned in the dent 106. Annular set dents 113 are formed on the outer circumference of the solid type filler material body 115. And annular set dents 114 which are slightly larger than the come-off dents 107 are formed on the bottom of the solid type filler material body 115. A hardening material 117 is charged in the clearance between the outer circumference of the solid type filler material body 115 including the set dents 113 and the inner circumferential face of the dents 106, and a hardening material 117 is also charged in the clearance between the bottom face of the solid type filler material body 115 including the set dents 114, the come-off protrusion 116 and the come-off preventing dents 107. The portion of the hardening material 117 located in the engaging dents 111 of the dents 106 constitutes the engaging protrusion 118.

In the guide bar according to this example of the embodiments, the solid type filler material 112 molded in advance is inserted in the dents 106 and the come-off preventing dents 107. With the solid type filler material inserted in them, two-liquid mixing type hardening filler material is charged in the clearance between the solid type filler material 112, the dents 106 and the come-off preventing dents 107. And the filler material is hardened to cause a hardening material 117 to be formed.

In this case, the hardening material 117 functions as wedge and tightly fixes the solid type filler material 112. Besides, as the solid type filler material 112 has been molded in advance, the working efficiency is very good.

SEVENTEENTH EXAMPLE OF THE EMBODIMENTS

Figure 39:
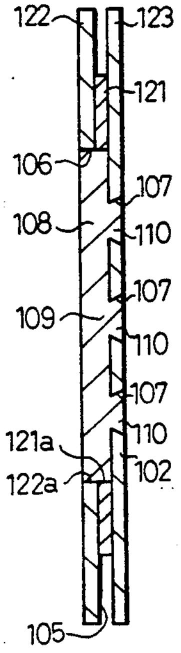
FIG. 39 is a sectional view showing a guide bar according to the seventeenth example of the embodiments of the invention.

As shown in FIG. 39, the guide bar 102 according to the seventeenth example of the embodiment of the invention consists of an inner plate 121 and a pair of the side plates 122 and 123. The side plates 122 and 123 are overlapped on both the sides of the inner plate 121. The inner plate 121 is small in size in comparison with the side plates 122 and 123. The stage gap formed by the inner plate 121 and the side plates 122 and 123 becomes a guide groove 105 for guiding the saw chain 103. The through holes **122*a* and 121*a* of the same shape correspond to one side plate 122 and the inner plate 121, respectively, thereby causing the dent 106 to be formed. Through holes of which area is smaller than that of the through holes 122*a* and 121*a* are formed on the other side plate, thereby causing a come-off preventing plate 107** to be constituted.

The come-off preventing dents 107 and the come-off preventing protrusions 110 are provided so as to form three stages (upper, middle and lower stages).

EIGHTEENTH EXAMPLE OF THE EMBODIMENTS

Figure 40:
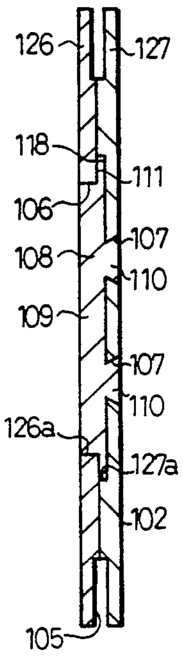
FIG. 40 is a sectional view showing a guide bar according to the eighteenth example of the embodiments of the invention.
Figure 37:
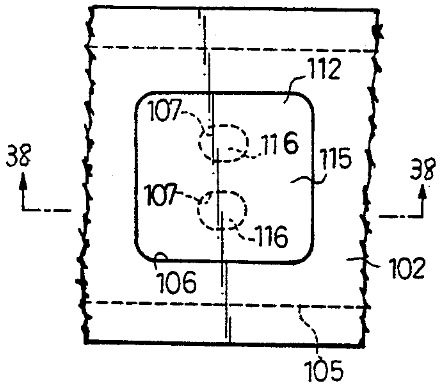
FIG. 37 is a partially front elevation view showing a guide bar according to the sixteenth example of the embodiments of the invention.

As shown in FIG. 40, the guide bar body 102 according to the eighteenth example of the embodiments of the invention has two side plates 126 and 127. A through hole 126 having large area is formed at one side plate 126, and another dent **127*a* having still larger area than that of the through hole 126 is formed at the other side plate 127. A dent 106 is formed by means of the through hole 126*a* and the dent 127*a*. The inner circumferential face of the dent 127 becomes an engaging dent 111, and a through hole having a still smaller area than that of the through hole 126*a* is formed on the other side plate 127 and becomes a come-off preventing dent 107**.

NINETEENTH EXAMPLE OF THE EMBODIMENTS

Figure 41:
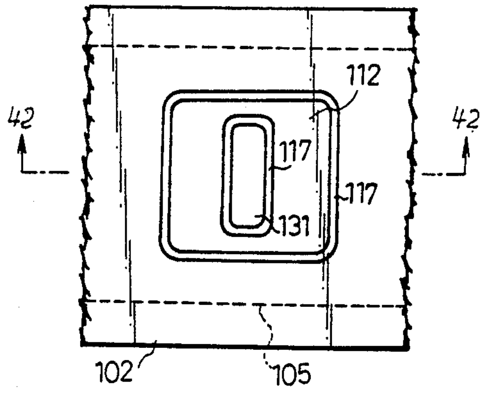
FIG. 41 is a partial front elevation view showing a guide bar of the nineteenth example of the embodiments of the invention.
Figure 42:
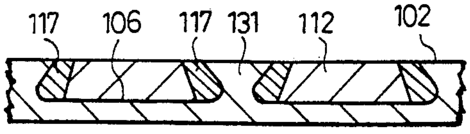
FIG. 42 is an enlarged sectional view taken along with the line 42—42 in FIG. 41.

As shown in FIG. 41 and FIG. 42, a square-like annular dent 106 is formed in the guide bar body 102 according to the nineteenth example of the embodiments. The inner circumferential face of the dent 106 is of inversed tapered shape getting narrow outwardly. The middle portion of the dent 106 becomes a come-off preventing protrusion 131. A solid type filler material 112 is inserted in the dent 106. The solid type filler material 112 has the outer circumference which is slightly smaller than the inner circumference of the dent 106, and has an opening which is slightly larger than the outer circumference of the come-off preventing protrusion 131. The hardening material 117 similar to that in the sixteenth example of the embodiments is charged in the clearance between the dent 106 and the solid type filler material 112.

TWENTIETH EXAMPLE OF THE EMBODIMENTS

Figure 43:
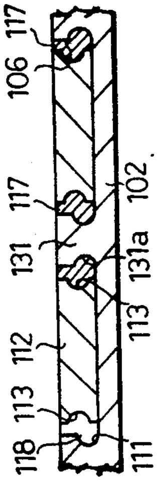
FIG. 43 is a sectional view showing a guide bar according to the twentieth example of the embodiments of the invention.

The guide bar body 102 according to the twentieth example of the embodiments is shown in FIG. 43. An engaging dent 111 is formed at the dent 106 according to the nineteenth example of the embodiments instead of the inversed tapered inner circumferential face. Also, an annular set dent 113 is formed on both the outer circumferential faces of the solid type filler materials 112 according to the nineteenth example of the embodiments. A come-off preventing groove **131*a* which covers the whole outer circumference at the base of the come-off preventing protrusion 131. A hardening material 117 is charged in the clearance between the dent 106 and the solid type filler material 112 and between the come-off preventing protrusion 131 and the solid type filler material 112 as well as in the sixteenth example of the embodiments, and the hardening material 117 is charged up to both the set dents 113**.

TWENTY-FIRST EXAMPLE OF THE EMBODIMENTS

The guide bar body 102 according to the twenty-first example of the embodiments is shown in FIG. 44 through FIG. 48. Dents 106 are formed (two dents at a single side) at both the sides of the guide bar body 102 with equal interval. At the position corresponding to the dents 106 at one side, many of come-off preventing dents 136 having small area, which can communicate with the dents 106, scatter and are formed on the other side. The dents 106 are provided with filler materials 108. Rivets 137 are inserted from the come-off preventing dents 136 to the dents 106, thereby causing the filler materials 108 in the dents 106 to be tightly fixed.

As a modified example of this twenty-first example of the embodiments, a solid type filler material 112 having slightly smaller outer circumference than the inner circumference of the dents 106 may be provided instead of the filler material 108 as well as in the sixteenth, the nineteenth and the twentieth examples of the embodiments. A hardening material 117 is provided in the clearance between this solid type filler material 112 and the dents 106.

TWENTY-SECOND EXAMPLE OF THE EMBODIMENTS

Figure 49:
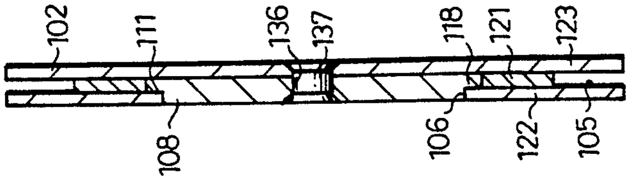
FIG. 49 is a sectional view showing a guide bar according to the twenty-second example of the embodiments of the invention.
Figure 48:
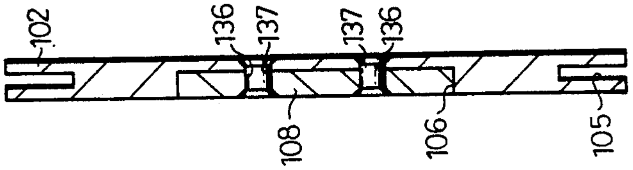
FIG. 48 is an enlarged sectional view taken along with the line 48—48 in FIG. 44.
Figure 44:
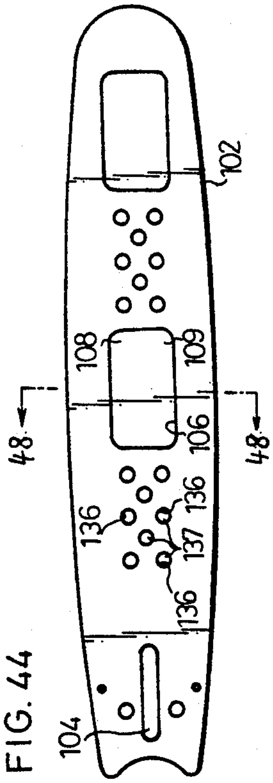
FIG. 44 is the front elevation view of a guide bar according to the twenty-first example of the embodiments of the invention.
Figure 45:
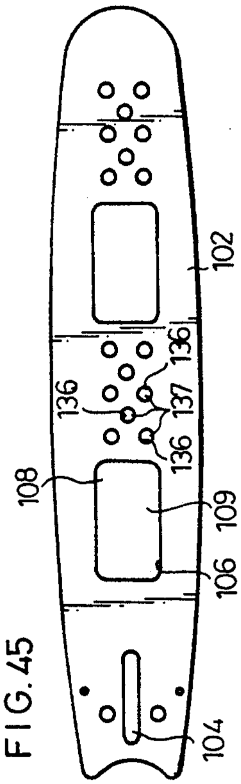
FIG. 45 is the rear elevation view of FIG. 44.
Figure 46:
FIG. 46 is the plane view of FIG. 44.
Figure 47:
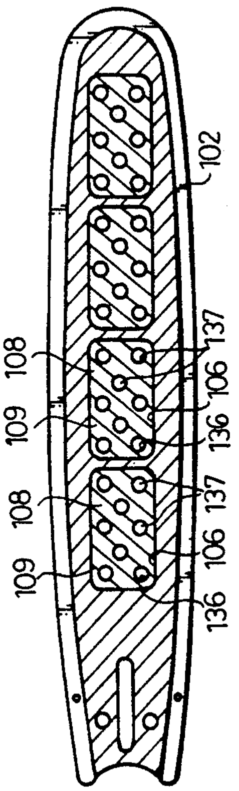
FIG. 47 is a sectional view taken along with the line 47—47 in FIG. 46.

As shown in FIG. 49, the guide bar body according to the twenty-second example of the embodiments consists of an inner plate and a pair of side plates 122 and 123 as well as the guide bar 102 in the seventeenth example of the embodiments. The inner plate 121 of the dent 106 is widened in diameter, thereby causing the engaging dent 111 to be constituted.

TWENTY-THIRD EXAMPLE OF THE EMBODIMENTS

Figure 50:
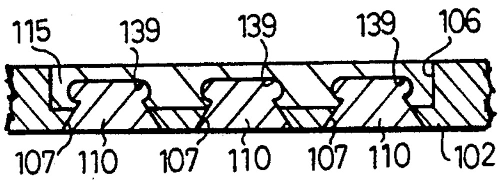
FIG. 50 is a sectional view showing a guide bar according to the twenty-third example of the embodiments of the invention.

As shown in FIG. 50, the guide bar body 102 according to the twenty-third example of the embodiments is the same as that according to the sixteenth example of the embodiments, excepting the hardening material 117. An engaging dent 139 which communicates with the come-off preventing dent 107 is formed at the bottom of the solid type filler material 115. Two-liquid mixing type come-off preventing protrusion 110 is injected, charged and hardened in both the engaging dent 139 and the come-off preventing dent 107.

As a modified example of the twenty-third example of the embodiments, such a material as light metal alloy, which is not welded to the solid type filler pin described hereinafter may be employed instead of the solid type filler material body 115. A solid type filler pin (made of synthetic resin) is driven in the engaging dent 139 of the solid type filler material body 115 and the come-off preventing dent 107 instead of a come-off preventing protrusion 110, and the pin is heated by ultrasonic wave, etc., and the head thereof is melted down and welded to the engaging dent 139.

TWENTY-FOURTH EXAMPLE OF THE EMBODIMENTS

Figure 51:
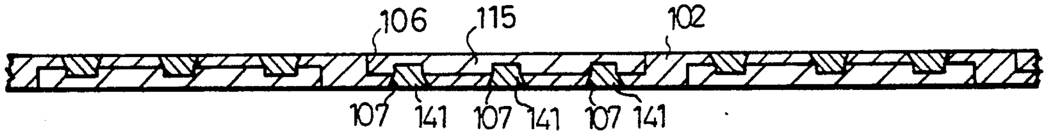
FIG. 51 is a sectional view showing a guide bar according to the twenty-fourth example of the embodiments of the invention.

As shown in FIG. 51, in the guide bar 102 according to the twenty-fourth example of the embodiments, the solid type filler material body 115 is made of synthetic resin which is welded to the solid type filler pin 141. The solid type filler pin 141 is driven into the solid type filler material 115 and heated and welded by ultrasonic waves.

TWENTY-FIFTH EXAMPLE OF THE EMBODIMENTS

Figure 52:
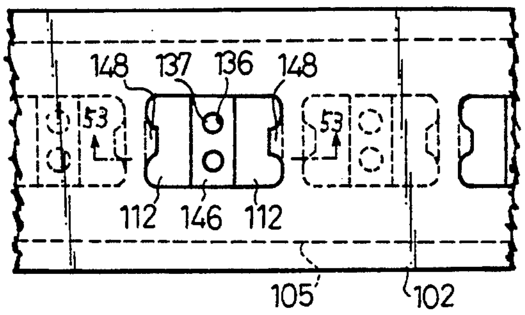
FIG. 52 is a partially front elevation view showing a guide bar according to the twenty-fifth example of the embodiments of the invention.
Figure 53:
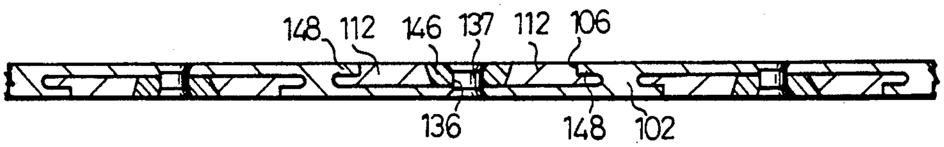
FIG. 53 is an enlarged sectional view taken along with the line 53—53 in FIG. 52.

As shown in FIG. 52 and FIG. 53, the guide bar body 102 according to the twenty-fifth example of the embodiment has a plain and roughly rectangular dent 106. Engaging protrusions 148 are formed outwardly at the right and left sides of the dent 106. A solid type filler material 112 is inserted in both the right and left portions in the dent 106 including the underside of the engaging protrusions 148. The solid filler material 112 is of tapered shape as the end face of the center side of the dent 106 goes inwardly.

A set filler material 146 having a tapered end face which corresponds to the tapered end face of both the filler materials 112 is inserted between both the solid type filler materials 112. The set filler materials 146 are fixed to the guide bar body 102 by means of rivets 137.

TWENTY-SIXTH EXAMPLE OF THE EMBODIMENTS

The ensuing description explains the twenty-sixth example of the embodiments, in which the fourteenth, the fifteenth and the sixteenth examples of the embodiments are furthermore embodied.

As shown with two-dashed lines in FIG. 34, FIG. 36 and FIG. 38, a thin film "A" made of metal or resin is adhered to or attached by baking to the surface of the guide bar body 102, the filler material 108 and the solid type filler material 112. As a result, the stage gap between the surface of the guide bar body 102, the surface of the filler material 108, and the surface of the solid filler material 112 can be smoothened.

For this reason, even though the stage gap between the surface of the guide bar body 102, the surface of the filler material 108 and the surface of the solid type filler material 112 is not machined or ground, the working efficiency is not spoiled in use. Any surface grinding or surface cutting is not needed, the guide bar can be manufactured at a low cost. And the film "A" can prevent the filler material 108 and the solid type filler material 112 from coming off from the guide bar body 2.

And in case that the film "A" is made of a membrane such as teflon, etc., the friction due to the stage gap between the surface of the guide bar body 102 and the surface of the filler material 108 and the solid type filler material 112 may be lessened, too.

As a modified example of the twenty-sixth, a painted membrane of which thickness is more than 0.04 mm can be used instead of the film "A".

TWENTY-SEVENTH EXAMPLE OF THE EMBODIMENTS

Figure 55:
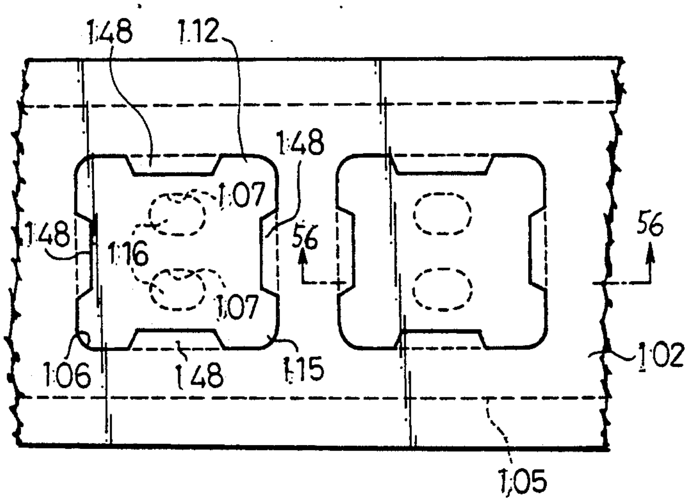
FIG. 55 is the front elevation view showing a guide bar according to the twenty-seventh example of the embodiments of the invention.
Figure 56:
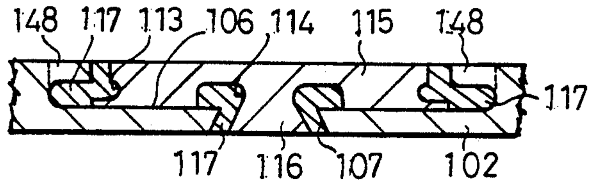
FIG. 56 is an enlarged sectional view taken along with the line 56—56 n FIG. 55.

As shown in FIGS. 55 and 56, in the guide bar body 102 according to the twenty-seventh example of the embodiments, engaging protrusions 148 similar to the above twenty-fifth example of the embodiments are formed at each side of the opening of the dent 106 in the above sixteenth example of the embodiments.

Also, in this example of the embodiments, even though the interval between respective dents 106 is made small in comparison with the sixteenth example of the embodiments and the cubic volume of the solid type filler material 115 is increased, the strength of the guide bar body 102 can be maintained as the engaging protrusions 148 are provided.

ANOTHER EXAMPLE

Figure 54:
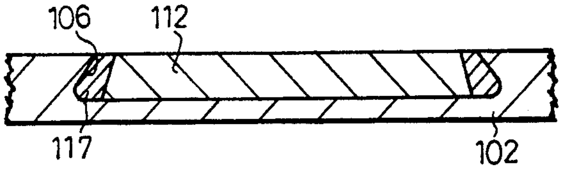
FIG. 54 is a sectional view of a guide bar of another example.

As shown in FIG. 54, a guide bar in which the come-off preventing portion 131 in the nineteenth example of the embodiment is omitted may be available, too.

TWENTY-EIGHTH EXAMPLE OF THE EMBODIMENTS

The following description explains the twenty-eighth example of the embodiments with reference to FIG. 57 through FIG. 62.

Figure 57:
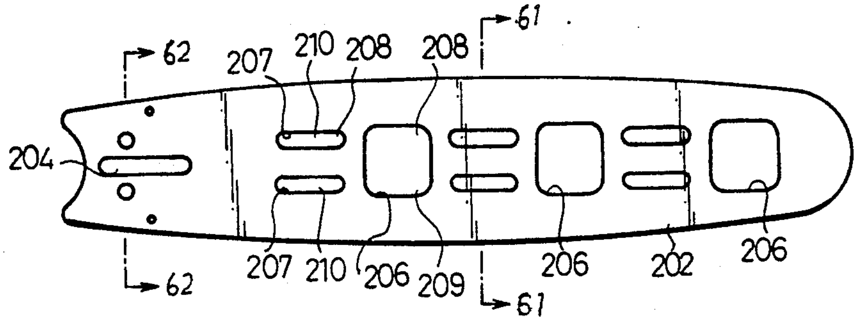
FIG. 57 is the front elevation view of a guide bar according to the twenty-eighth example of the embodiments of the invention.
Figure 69:
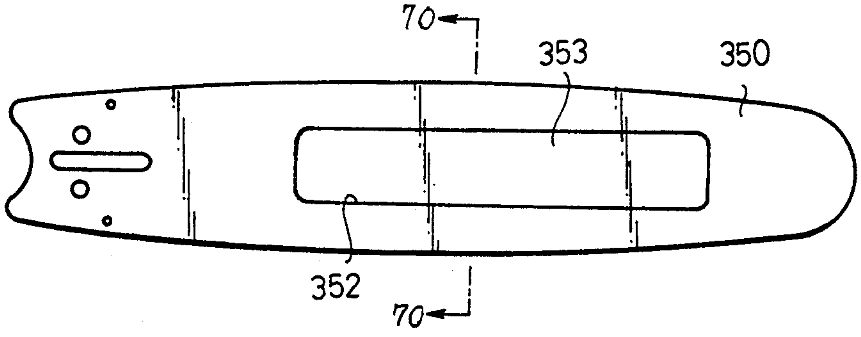
FIG. 69 is the front elevation view showing another conventional guide bar.

As shown in FIG. 57, the guide bar body 202 according to the twenty-eighth example of the embodiment is made of a single plate-like material. A mounting 204 for mounting the guide bar body 202 at the chain saw body 101 is provided at the base end portion. A guide groove 205 is formed at the circumference of the guide bar 202 to guide a saw chain 103.

Figure 62:
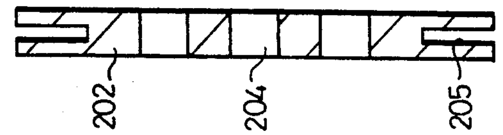
FIG. 62 is an enlarged sectional view taken along with the line 62—62 in FIG. 57.
Figure 61:
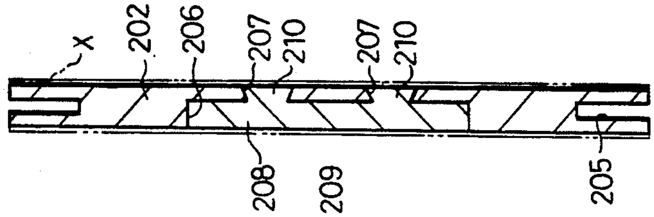
FIG. 61 is an enlarged sectional view taken along with the line 61—61 in FIG. 57.
Figure 58:
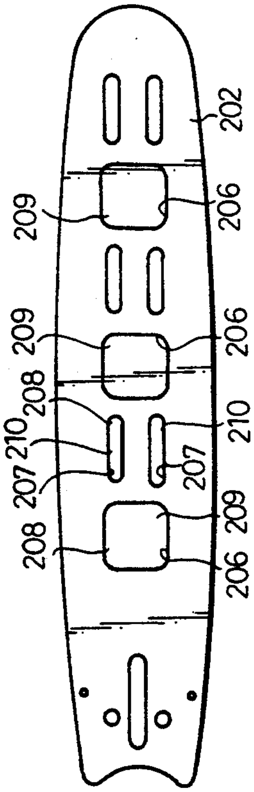
FIG. 58 is the rear elevation view of FIG. 57.
Figure 59:
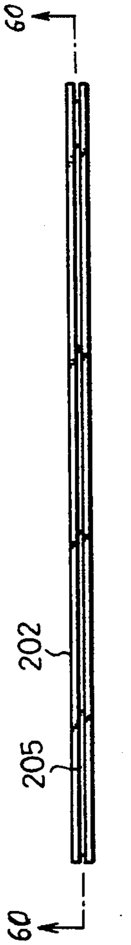
FIG. 59 is the plane view of FIG. 57.
Figure 60:
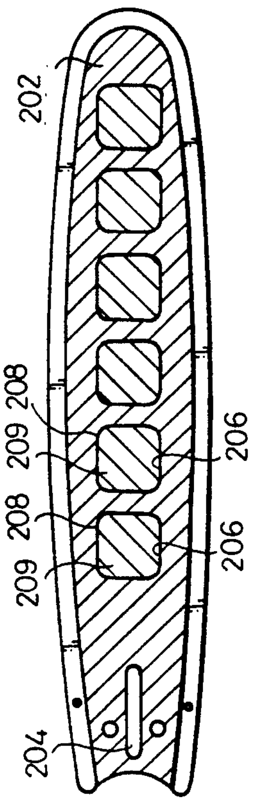
FIG. 60 is a sectional view taken along with the line 60—60 in FIG. 59.
Figure 64:
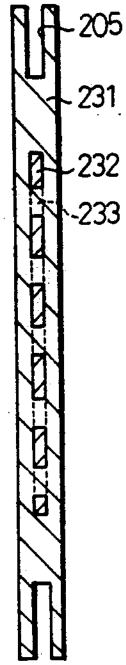
FIG. 64 is a sectional view taken along with the line 64—64 in FIG. 63.

As shown in FIG. 58, FIG. 59 and FIG. 62, roughly square-like dents 206 are arranged at both the sides of the guide bar body 202 with equal interval. A pair of come-off preventing dents 207 are vertically formed at the opposite side of the dents 206 at the position corresponding to the dents 206, so that the dents 207 may come near the middle between the dents 206, and the come-off preventing dents 207 communicate with the dents 106. The area of these come-off preventing dents 207 is smaller than that of the dents 206 and are long and slender in the right and left direction in FIG. 58. The come-off preventing dents 207 has a tapered face which is widened outwardly. Filler material 208 made of synthetic resin is filler up in both the dents 206 and 207. The filler materials 208 consists of a filler material body positioned in the dent 206 and a come-off preventing protrusion 210 positioned in the come-off dent 207. As shown in FIG. 62, a water proof membrane-like film "X" made of metal or resin, etc. is attached to or adhered by baking to the surface of the guide bar body 202 and the surface of the filler material 208.

In the case of this example of the embodiment, the waterproof film "X" is covered with a filler material 208. As the filler material 208 does not suck in water or humidity in the cutting work, it is no problem even though the filler material 208 has water or humidity sucking property. Therefore, a filler material 208 which is cheap in cost can be used.

As the filler material 208 is covered with the film "X", the filler material 208 does not suck in water or humidity through the clearance even if there leaves clearance between the filler material 208 itself and both the dents 206. Also, the filler material 208 does not come out from the dents 206 and 207. Therefore, regardless of the presence of clearance between the filler material 208 and both the dents 206 and 207, an easy and cheap charging method of a filler material 208 may be employed. In the guide bar according to the twenty-eighth example of the embodiments, the cost reduction can be remarkably realized.

TWENTY-NINTH EXAMPLE OF THE EMBODIMENTS

In this example of the embodiment, a kind of paint having water repellent property is coated to or impregnated in the guide bar body 202 and the filler material 208 instead of the film "X" in the guide bar according to the twenty-eighth example of the embodiment.

This example of the embodiments has the same effects as those in the twenty-eighth example of the embodiments. In the case that clearance exists between the filler material 208 and both the dents 206 and 207, the paint enters the clearance, thereby causing the clearance to be gone or to become slight. In the case that the texture of the filler material 208 is rough, as the paint may invade in the vicinity of the surface of the filler material 208, the effects can be continued even though the surface paint is consumed.

THIRTIETH EXAMPLE OF THE EMBODIMENTS

In this example of the embodiments, a film of thin membrane having low friction such as teflon may be attached to or adhered by baking to the guide bar body 202 or the filler materials 208, instead of the film "X" in the guide bar according to the twenty-eighth example of the embodiments.

In the guide bar according to this example of the embodiments, as resistance given to the side of the guide bar in use can be remarkably decreased, the workability and the working efficiency can be much increased.

THIRTY-FIRST EXAMPLE OF THE EMBODIMENTS

In this example of the embodiments, such a substance having a low friction as teflon may be coated to or impregnated in the guide bar body 202 and the filler material 208 instead of a low friction film in the guide bar according to the thirtieth example of the embodiments.

THIRTY-SECOND EXAMPLE OF THE EMBODIMENTS

The guide bar according to this example of the embodiments is composed of such a light material as resin or ceramics, etc., and the guide bar is formed to be plain without forming any dent on the surface thereof. Also, such a low friction substance as teflon may be coated to or impregnated in the surface of the guide bar.

Conventionally, using resin in the guide bar itself has not been realized yet due to shortage of durability against friction heat and friction which may be produced by high speed travelling of the chain saw. For this reason, it is necessary that the guide bar body is made of metal, thereby causing the cost thereof to become high.

In the guide bar according to this example of the embodiments, the friction heat is less generated by virtue of functions of low friction substances, and the wearing of the guide bar due to friction can be remarkably decreased. Therefore, the guide bar body can be made of resin. Accordingly, remarkable cost reduction can be accomplished in a guide bar for a low horsepower chain saw such as small-sized electric chain saw.

As another example of the thirty-second example of the embodiments, the surface of the guide bar may be covered with a low friction film.

THIRTY-THIRD EXAMPLE OF THE EMBODIMENTS

In this example of the embodiments, the guide bar body 202 in the thirtieth and the thirty-first examples of the embodiments is composed of such light materials as resin or ceramics, etc. Furthermore, a metal plate may be used as filler material 208.

In the guide bar according to this example of the embodiment, as the dents 206 are filled up with metal plate, the guide bar body 202 has a proper rigidity even it is made of resin or ceramics.

THIRTY-FOURTH EXAMPLE OF THE EMBODIMENTS

Figure 63:
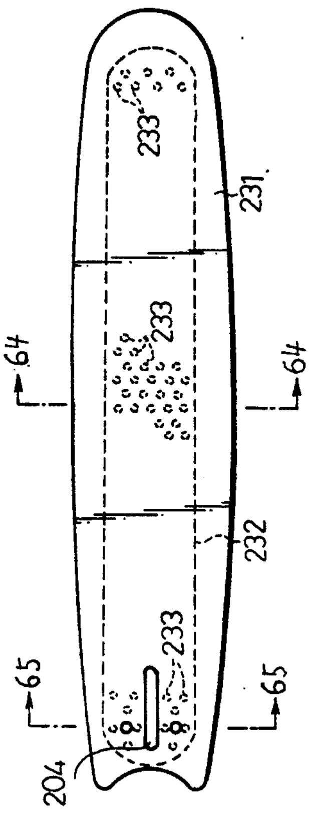
FIG. 63 is the front elevation view of a guide bar according to the thirty-fourth example of the embodiments of the invention.
Figure 65:
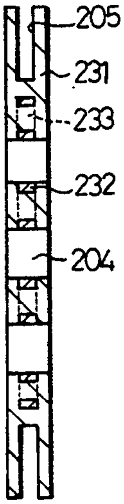
FIG. 65 is a sectional view taken along with the line 65—65 in FIG. 63.
Figure 70:
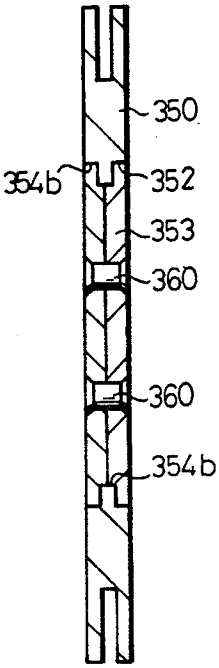
FIG. 70 is an enlarged sectional view taken along with the line 70—70 in FIG. 69.
Figure 71:
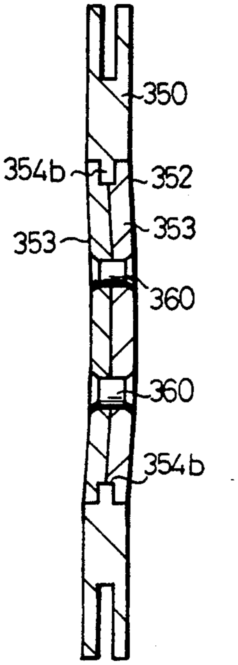
FIG. 71 is a sectional view showing such a state that filler materials of the guide bar in FIG. 70 swells out.
Figure 66:
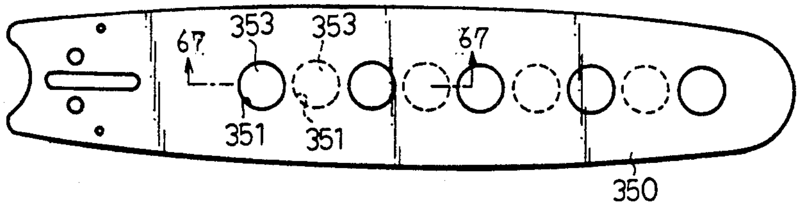
FIG. 66 is the front elevation view showing the conventional guide bar.
Figure 67:
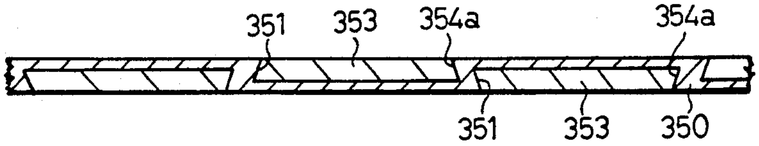
FIG. 67 is an enlarged sectional view taken along with the line 67—67 in FIG. 66.
Figure 68:
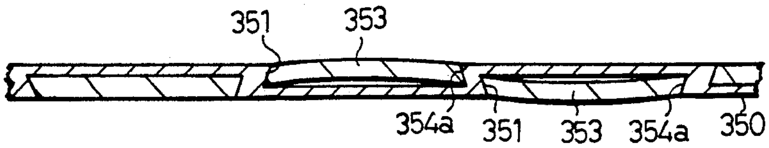
FIG. 68 is a sectional view showing such a state that filler materials of the guide bar in FIG. 67 swells out.

As shown in FIGS. 63 and 65, the guide bar 131 is made of such light materials as resin or ceramics. Metal plate 132 having many of through holes 133 is sealed insides. The surface of this guide bar 131 is coated or impregnated with such a low friction substance as teflon, etc.

In this example of the embodiments, as metal plate 132 is sealed insides, the guide bar 131 can have proper rigidity even though it is made of resin or ceramics.

As another example of this example of the embodiment, the surface of the guide bar 131 is covered with a low friction film.

The twenty-eighth through the thirty-fourth examples of the embodiments can be changed as shown below; for instance, glass fiber or ceramics, metal powder, a metal material such as press-formed articles made of aluminum or thin steel plate or other substance which can heighten the strength and the rigidity may be used as filler material 208, too.

It is recommended that the thickness of the film "X", paint, low friction film and other low friction substances in the twenty-eighth through the thirty-fourth examples of the embodiments is thick. It is desirable that the minimum thickness is 0.04 through 0.06 mm through it depends upon the kinds of paints and films.

Furthermore, in the guide bar according to the twenty-eighth through the thirty-first and the thirty-third example of the embodiments, respective dents 206 may communicate with each other.

Also, in the twenty-eighth through the thirty-fourth examples of the embodiments, such a guide bar as being composed of a laminated structure of a plurality of members may be embodied. In addition, a sprocket, roller or other structure may be adopted at the leading edge portion of the guide bar.

As many apparently widely different embodiments of this invention may be made without departing from the spirit and scope thereof, it is to be understood that the invention is not limited to the specifiç embodiments thereof except as defined in the appended claims.

What is claimed is:

1. A guide bar for a chain saw comprising:

an elongated main body having first and second sides;

a plurality of spaced apart first recesses formed in a central portion of the first side of the main body thereby forming a plurality of spaced apart first reinforcing supports in the central portion of said first side of the main body, each reinforcing support having a tapered hole extending therethrough;

a plurality of spaced apart second recesses formed in a central portion of the second side of the main body thereby forming a plurality of spaced apart second reinforcing supports in the central portion of said second side of the main body, each second reinforcing support having a tapered hole extending therethrough, said first and second reinforcing supports being staggered with respect to each other such that each reinforcing support is positioned opposite a recess formed in the opposing side of the main body and said first and second recesses overlap on opposing ends of said reinforcing supports to form a plurality of openings extending entirely through said main body;

an injection molded resin based filling material that fills said first and second recesses; and securing means passing through each said tapered hole to secure the filling material in an opposing recess to the guide bar.

2. A guide bar as recited in claim 1 wherein said tapered holes are filled with said filling material to form said securing means.

3. A guide bar as recited in claim 1 wherein said securing means includes a plurality of rivets.

4. A guide bar as recited in claim 1 wherein each reinforcing support includes a plurality of tapered holes.

5. A guide bar as recited in claim 1 wherein:

said recesses include notches that extend into said main body so as to form lips in the main body; and the fill material that flows into the notches forms ears which cooperate with the lips to help hold the fill material in place.

6. A guide bar as recited in claim 5 wherein each recess includes a plurality of notches.

7. A guide bar as recited in claim 1 wherein said reinforcing supports are wider than said openings.

8. A guide bar as recited in claim 7 wherein said recesses are substantially rectangular in shape.

9. A guide bar as recited in claim 7 wherein said recesses are substantially hexagonal in shape.

10. A guide bar as recited in claim 1 wherein said main body includes first and second plates, said first recesses being formed in said first plate and said second recesses being formed in said second plate.

11. A guide bar as recited in claim 10 wherein said main body further comprises a third plate sandwiched between said first and second plates, said third plate having a plurality of holes extending therethrough in the regions where said first and second recesses overlap to form the openings extending entirely through said main body.

12. A guide bar for a chain saw comprising:

an elongated main body having first and second sides;

a plurality of spaced apart isolated recesses formed at first and second sides in a central portion of the main body, each recess having a tapered hole extending therefrom entirely through one side of main body, the tapered holes being substantially smaller than their associated recesses;

filling material that fills said recesses and said tapered holes to integrally form an enlarged plug portion in each recess and a smaller anchor portion in each tapered hole for securing their associated plugs to the guide bar.

13. A guide bar as recited in claim 12, wherein each said recess has a pair of associated tapered holes.

14. A guide bar as recited in claim 12 wherein:

each recess includes a rim portion that extends slightly into the main body beneath the side surfaces of the main body so as to form a lip in the main body; and fill material flows into the notch to form an ear which cooperates with the lip to help hold the fill material in place.

15. A guide bar as recited in claim 14 wherein the fill material inserted into each recess includes:

a rigid plug having a tapered anchor portion sized to slip through a narrowed portion of the tapered hole then inserted from the recess side of the main body; and a hardened material that fills the gaps formed between the anchor portion of the rigid plug and the tapered hole, as well as gaps formed between the notch and the rigid plug to firmly anchor the rigid plug into the recess.

16. A guide bar for a chain saw comprising: an elongated main body having first and second sides; a plurality of spaced apart recesses formed in a central portion of the main body, a plurality of posts formed integrally with the main body, each post extending upward into a central portion of an associated recess, the posts each being substantially smaller than the recess and having an overhanging lip portion thereon; and filling material that fills said recesses to form a plug in each recess, the fill material cooperating with the posts to firmly secure their associated plugs to the main body.

17. A guide bar as recited in claim 16 wherein:

each recess includes a rim portion that extends slightly into the main body beneath the side surfaces of the main body so as to form a lip in the main body; and fill material flows into a notch to form an ear which cooperates with the lip to help hold the fill material in place.

18. A guide bar as recited in claim 17 wherein the fill material inserted into each recess includes:

a rigid plug having a tapered anchor portion having an opening therein sized to slip over a post to be inserted into the recess; and a hardened material that fills the gaps formed between the hole in the rigid plug and the post, as well as gaps formed between the notch and the rigid plug to firmly anchor the rigid plug into the recess.

* * * * *